US012802461B2

(12) United States Patent
Yamazaki et al.

(10) Patent No.: US 12,802,461 B2

(45) Date of Patent: Nov. 17, 2026

(54) RECOGNITION SYSTEM, RECOGNITION DEVICE, RECOGNITION METHOD, NON-TRANSITORY COMPUTER READABLE STORAGE MEDIUM, AND RECOGNITION DATA GENERATION METHOD

(71) Applicant: DENSO CORPORATION, Kariya-city (JP)

(72) Inventors: Suguru Yamazaki, Kariya-city (JP); Kenji Muto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 174 days.

(21) Appl. No.: 18/949,516

(22) Filed: Nov. 15, 2024

(65) Prior Publication Data

US 2025/0069412 A1 Feb. 27, 2025

Related U.S. Application Data

(63) Continuation of application No. PCT/JP2023/011006, filed on Mar. 20, 2023.

(30) Foreign Application Priority Data

May 19, 2022 (JP) ................................ 2022-082484
Mar. 13, 2023 (JP) ................................ 2023-038950

(51) Int. Cl.

| | |
|---|---|
| ***G06V 20/58*** | (2022.01) |
| ***G01S 7/48*** | (2006.01) |
| ***G01S 17/89*** | (2020.01) |
| ***G06V 10/26*** | (2022.01) |

(52) U.S. Cl.
CPC ............ *G06V 20/58* (2022.01); *G01S 7/4802* (2013.01); *G01S 17/89* (2013.01); *G06V 10/26* (2022.01)

(58) Field of Classification Search
CPC ...... G06V 20/58; G06V 10/26; G01S 7/4802; G01S 17/89; G01S 17/42; G01S 17/931; G08G 1/16
See application file for complete search history.

(56) References Cited

U.S. PATENT DOCUMENTS

2015/0353078 A1 12/2015 Kaminade
2020/0118284 A1 4/2020 Takamura
2021/0389460 A1* 12/2021 Yoshizawa ............ G08G 1/015
(Continued)

FOREIGN PATENT DOCUMENTS

JP 2018-165654 A 10/2018

*Primary Examiner* — Md K Talukder
(74) *Attorney, Agent, or Firm* — Precision Patents, P.C.

(57) ABSTRACT

A target moving object movable in a scanning space scanned by illumination light is recognized. Scanning data including a far side point group is acquired as a scanning point group on a far side of a reflector in a scanning direction in which the reflector is disposed in a focus range having a reflection characteristic on a high reflection side. Recognition data is generated by excluding, from the far side point group for a recognition target, a part of the far side point group corresponding to a symmetrical point group in a symmetrical area of the position on the far side of the reflector. The symmetrical point group corresponds to a scanning point group of a real image that causes a virtual image to appear at the position on the far side of the reflector.

15 Claims, 21 Drawing Sheets

(56) References Cited

U.S. PATENT DOCUMENTS

| | | | | |
|---|---|---|---|---|
| 2022/0392194 | A1* | 12/2022 | Akiyama | G01S 17/42 |
| 2023/0080428 | A1* | 3/2023 | Takagi | B60W 40/04 356/5.01 |
| 2023/0080655 | A1 | 3/2023 | Yomo et al. | |
| 2023/0267746 | A1* | 8/2023 | Ichiki | G06V 10/761 348/148 |

* cited by examiner

RECOGNITION SYSTEM, RECOGNITION DEVICE, RECOGNITION METHOD, NON-TRANSITORY COMPUTER READABLE STORAGE MEDIUM, AND RECOGNITION DATA GENERATION METHOD

CROSS REFERENCE TO RELATED APPLICATION

The present application is a continuation application of International Patent Application No. PCT/JP2023/011006 filed on Mar. 20, 2023, which designated the U.S. and claims the benefit of priority from Japanese Patent Applications No. 2022-082484 filed on May 19, 2022 and No. 2023-038950 filed on Mar. 13, 2023. The entire disclosures of all of the above applications are incorporated herein by reference.

TECHNICAL FIELD

The present disclosure relates to a recognition technique for recognizing a moving object.

BACKGROUND

Recognition techniques for recognizing a moving object disposed in a scanning space scanned with irradiation light from a scanning device are widely known. A conceivable technique teaches a recognition technique with eliminating a situation in which a virtual image caused by reflection of a laser beam, which is an irradiation light, is generated and the virtual image is erroneously recognized as a moving object.

SUMMARY

According to an example, a target moving object movable in a scanning space scanned by illumination light is recognized. Scanning data including a far side point group is acquired as a scanning point group on a far side of a reflector in a scanning direction in which the reflector is disposed in a focus range having a reflection characteristic on a high reflection side. Recognition data is generated by excluding, from the far side point group for a recognition target, a part of the far side point group corresponding to a symmetrical point group in a symmetrical area of the position on the far side of the reflector. The symmetrical point group corresponds to a scanning point group of a real image that causes a virtual image to appear at the position on the far side of the reflector.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
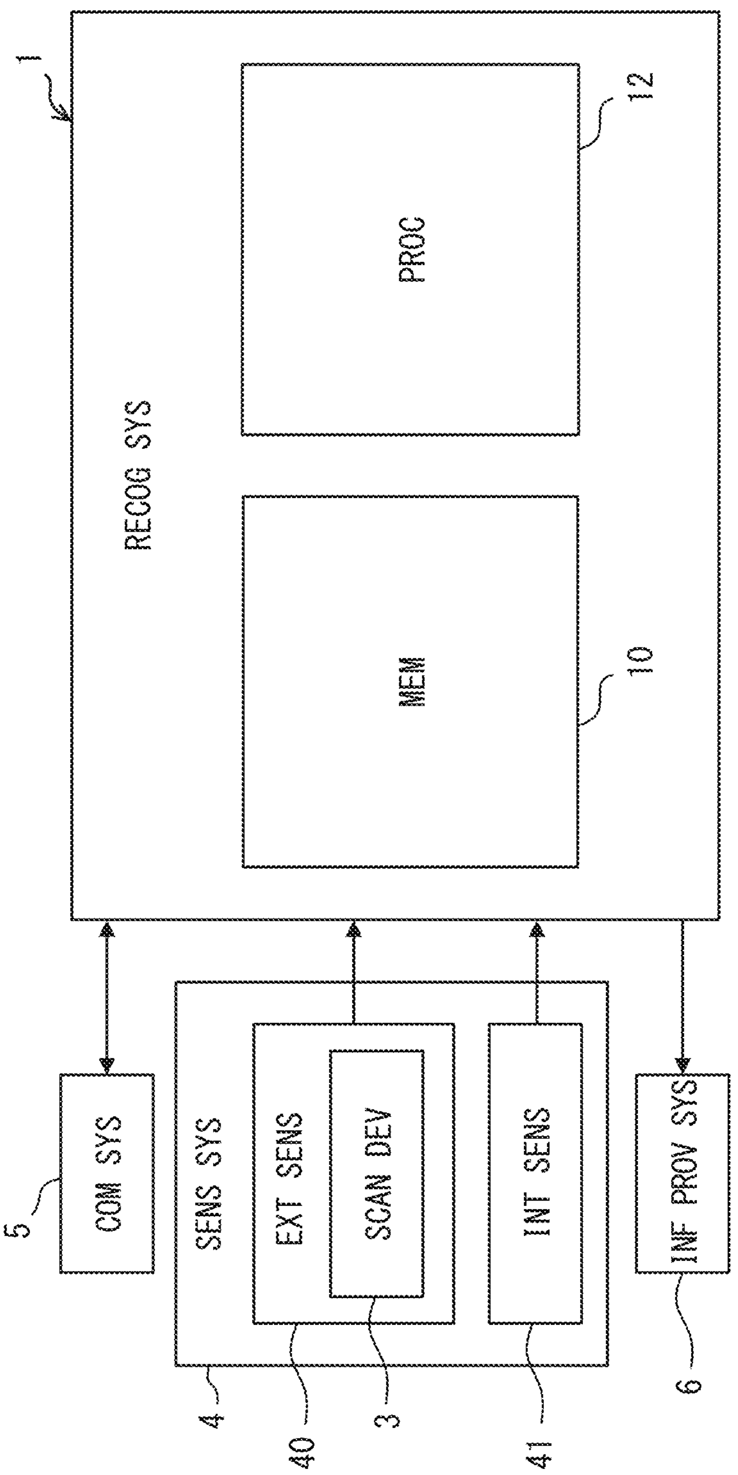
FIG. 1 is a block diagram illustrating an overall configuration of a recognition system according to a first embodiment.

In the recognition technique according to the conceivable technique, a pixel on a near side of the background range image, which is the scanning result when no moving object is disposed, is extracted as the moving object as a recognition target. However, when a reflector that causes a virtual image transmits the irradiation light, a moving object that is actually disposed on a far side when viewing from the scanning device may not be recognized. These issues are difficult to address with the recognition technique that uses the scanning device installed on a train platform, as in the conceivable technique, but are expected to be resolved with the recognition technique that uses the scanning device mounted on a vehicle.

An object of the present embodiments is to provide a recognition system with high recognition accuracy. Another object of the present disclosure is to provide a recognition device with high recognition accuracy. Another object of the present disclosure is to provide a recognition method with high recognition accuracy. Yet another object of the present disclosure is to provide a recognition program with high recognition accuracy.

Hereinafter, a technical solution of the present embodiments for solving the difficulties will be described.

According to a first example feature, a recognition system has a processor, and recognizes a target moving object capable of moving in a scanning space scanned by irradiation light from a scanning device in a host vehicle.

The processor is configured to:

acquire scanning data including a far side point group as a scanning point group at a position disposed on a far side of a reflector in a scanning direction in which the reflector is scanned by the irradiation light, the reflector being disposed in a focus range in which a reflection characteristic with respect to the irradiation light is on a high reflection side; and generate recognition data by excluding, from the far side point group for the target moving object as the recognition target in the scanning data, a part of the far side point group corresponding to a symmetrical point group which is disposed in a symmetrical area corresponding to the position on the far side of the reflector.

The symmetrical point group corresponds to a scanning point group of a real image that causes a virtual image to appear at the position on the far side of the reflector.

According to a second aspect of the present embodiments, a recognition device has a processor, and recognizes a target moving object capable of moving in a scanning space scanned by irradiation light from a scanning device in a host vehicle.

The processor is configured to:

acquire scanning data including a far side point group as a scanning point group at a position disposed on a far side of a reflector in a scanning direction in which the reflector is scanned by the irradiation light, the reflector being disposed in a focus range in which a reflection characteristic with respect to the irradiation light is on a high reflection side; and generate recognition data by excluding, from the far side point group for the target moving object as the recognition target in the scanning data, a part of the far side point group corresponding to a symmetrical point group which is disposed in a symmetrical area corresponding to the position on the far side of the reflector.

The symmetrical point group corresponds to a scanning point group of a real image that causes a virtual image to appear at the position on the far side of the reflector.

According to a third aspect of the present embodiments, a recognition method is executed by a processor for recognizing a target moving object capable of moving in a scanning space scanned by irradiation light from a scanning device in a host vehicle.

The recognition method includes:

acquiring scanning data including a far side point group as a scanning point group at a position disposed on a far side of a reflector in a scanning direction in which the reflector is scanned by the irradiation light, the reflector being disposed in a focus range in which a reflection characteristic with respect to the irradiation light is on a high reflection side; and generating recognition data by excluding, from the far side point group for the target moving object as the recognition target in the scanning data, a part of the far side point group corresponding to a symmetrical point group which is disposed in a symmetrical area corresponding to the position on the far side of the reflector.

The symmetrical point group corresponds to a scanning point group of a real image that causes a virtual image to appear at the position on the far side of the reflector.

According to a fourth aspect of the present embodiments, a recognition program includes instructions stored in a storage medium and executed by a processor for recognizing a target moving object capable of moving in a scanning space scanned by irradiation light from a scanning device in a host vehicle.

The instructions include:

acquiring scanning data including a far side point group as a scanning point group at a position disposed on a far side of a reflector in a scanning direction in which the reflector is scanned by the irradiation light, the reflector being disposed in a focus range in which a reflection characteristic with respect to the irradiation light is on a high reflection side; and generating recognition data by excluding, from the far side point group for the target moving object as the recognition target in the scanning data, a part of the far side point group corresponding to a symmetrical point group which is disposed in a symmetrical area corresponding to the position on the far side of the reflector.

The symmetrical point group corresponds to a scanning point group of a real image that causes a virtual image to appear at the position on the far side of the reflector.

According to a fifth aspect of the present embodiments, a recognition data generation method is executed by a processor for generating recognition data to recognize a target moving object capable of moving in a scanning space scanned by irradiation light from a scanning device in a host vehicle.

The recognition data generation method includes:

acquiring scanning data including a far side point group as a scanning point group at a position disposed on a far side of a reflector in a scanning direction in which the reflector is scanned by the irradiation light, the reflector being disposed in a focus range in which a reflection characteristic with respect to the irradiation light is on a high reflection side; and generating recognition data by excluding, from the far side point group for the target moving object as the recognition target in the scanning data, a part of the far side point group corresponding to a symmetrical point group which is disposed in a symmetrical area corresponding to the position on the far side of the reflector.

The symmetrical point group corresponds to a scanning point group of a real image that causes a virtual image to appear at the position on the far side of the reflector.

In this way, in the first to fifth aspects, in the scanning direction of the scanning device that scans the reflector in the focus range on the high reflection side with respect to the reflection characteristic of the irradiation light, the scanning data is acquired that includes the far side point group as a scanning point group at a position on the far side of the reflector. According to the first to fourth aspects, the recognition data is generated by excluding, from the far side point group for the target moving object as the recognition target in the scanning data, a part of the far side point group corresponding to a symmetrical point group which is disposed in a symmetrical area corresponding to the position on the far side of the reflector, and the symmetrical point group corresponding to a scanning point group of a real image that causes a virtual image to appear at the position on the far side of the reflector. According to this, the far side point group observed as a virtual image of the symmetrical point group at the far side position of the reflector can be excluded from the recognition target of the target moving body, and the far side point group observed as a real image at the far side position of the reflector can be properly recognized as the target moving body. Therefore, it is possible to suppress erroneous recognition caused by the occurrence of the virtual image and improve the recognition accuracy of the target moving object.

The following will describe embodiments of the present disclosure with reference to the drawings. It should be noted that the same reference symbols are assigned to corresponding components in the respective embodiments, and repeated descriptions may be omitted. When only a part of the configuration is described in each embodiment, the configurations of the other embodiments described above can be applied to remaining part of the configuration. Further, not only the combinations of the configurations explicitly shown in the description of the respective embodiments, but also the configurations of the multiple embodiments can be partially combined together even if the configurations are not explicitly described under a condition that there is no difficulty in the combination in particular.

Figure 2:
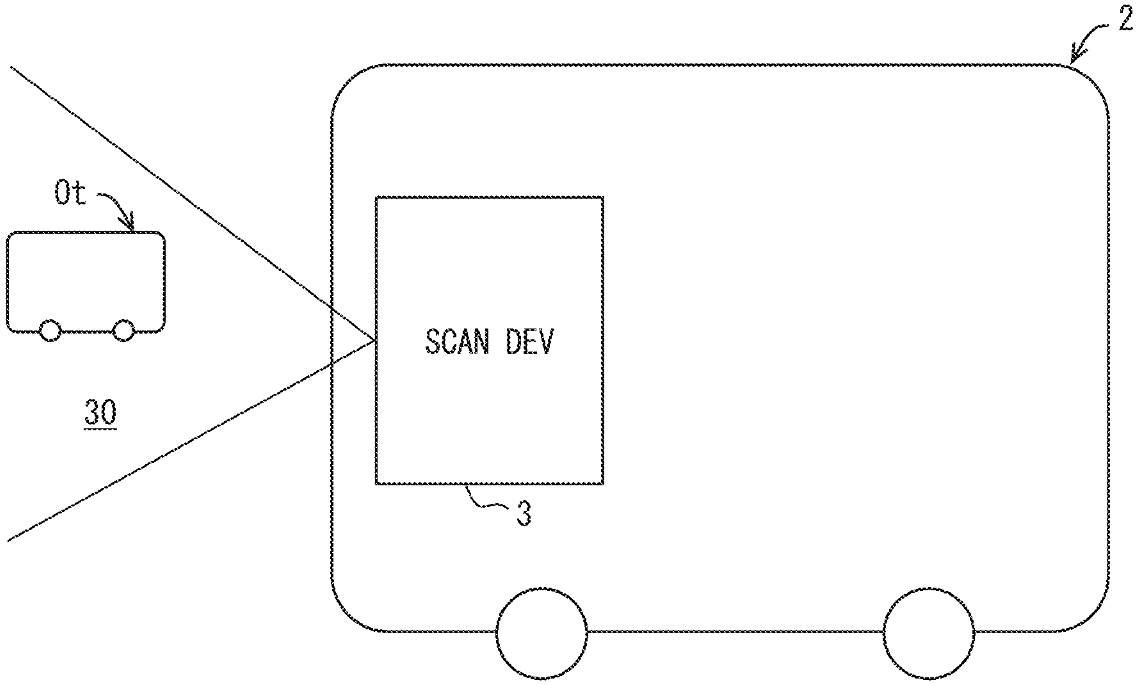
FIG. 2 is a schematic diagram illustrating a relationship between a scanning device of a host vehicle and a target moving object according to the first embodiment.

The recognition system 1 of the first embodiment shown in FIG. 1 recognizes a target moving object Ot that is movable in a scanning space 30 scanned by irradiation light from a scanning device 3 in a host vehicle 2 as shown in FIG. 2. Here, the host vehicle 2 to which the recognition system 1 is applied is a vehicle, such as an automobile, that can travel on a road with a passenger who gets on the vehicle. The target moving object Ot as a recognition target by the recognition system 1 is multiple types of an object, such as other vehicles other than the host vehicle 2, motorcycles, people, animals, autonomous travelling robots, and remote-controlled travelling robots.

In the host vehicle 2, an autonomous driving mode is executed such that levels of the autonomous driving mode are determined according to the degree of manual driving intervention by the passenger in a dynamic driving task. The autonomous driving mode may be achieved with an automated driving control, such as conditional driving automation, advanced driving automation, or full driving automation, where the system in operation performs all driving tasks. The autonomous driving mode may be achieved with an advanced driving assistance control, such as driving assistance or partial driving automation, where a passenger performs partial or all of the driving tasks. The autonomous driving mode may be realized by either one or combination of automated driving control and advanced driving assistance control or switching between the automated control and advanced driving assistance control.

The host vehicle 2 is equipped with a sensor system 4, a communication system 5, and an information presentation system 6 shown in FIG. 1. The sensor system 4 acquires sensor information for the external environment and the internal environment of the host vehicle 2 that can be used for driving control of the host vehicle 2 including recognition control in the recognition system 1. Therefore, the sensor system 4 includes an external sensor 40 and an internal sensor 41.

The external sensor 40 acquires information on the external environment as the periphery environment of the host vehicle 2 as the sensor information. The external sensor 40 includes a scanning device 3 that acquires the sensor information by scanning a scanning space 30 in the external environment of the host vehicle 2 with irradiation light. Such a scanning device 3 is a three-dimensional LiDAR (i.e., Light Detection and Ranging/Laser Imaging Detection and Ranging) that scans the scanning space 30 using infrared laser light as the irradiation light. In addition, the external sensor 40 other than the scanning device 3 may include at least one of the following types of sensors that sense the external environment of the host vehicle 2 such as a camera, a sonar, and the like.

Here, the scanning device 3 generates the sensor information by scanning the scanning space 30 (see FIG. 2) determined according to a viewing angle set toward the external environment of the host vehicle 2 with the irradiation light. In particular, the sensor information generated by the scanning device 3 of the first embodiment is scanning data Ds that three-dimensionally represents the state of a group of scanning points observed as reflection points of the irradiation light by an object in the scanning space 30. The scanning data Ds includes state values relating to at least one of distance, azimuth angle, position coordinates, speed, and beam reflection intensity. The distance as one of the status values included in the scanning data Ds may represent a measurement value by dTOF (i.e., direct time of flight) based on the flight time until a reflection echo is received as reflection light with respect to the irradiation light. The azimuth angle, which is one of the state values included in the scanning data Ds, may represent the scanning direction that changes in at least one of the horizontal direction and the vertical direction with respect to the scanning space 30.

The internal sensor 41 acquires information on the internal environment of the host vehicle 2 as the sensor information. The internal sensor 41 may include a physical quantity detection type sensor that detects a specific physical quantity of motion within the internal environment of the host vehicle 2. The physical quantity detection type internal sensor 41 is at least one type of, for example, a travelling speed sensor, an acceleration sensor, an inertial sensor, and the like. The internal sensor 41 may include a passenger detection type sensor that detects a specific state of a passenger in the internal environment of the host vehicle 2. The passenger detection type internal sensor 41 is at least one type of, for example, a driver status monitor (registered trademark), a biosensor, a seating sensor, an actuator sensor, an in-vehicle equipment sensor, and the like.

The communication system 5 acquires communication information usable for driving control of the host vehicle 2, including recognition control in the recognition system 1, via wireless communication. The communication system 5 may include a vehicle to everything (i.e., V2X) type system that transmits and receives a communication signal to and from a V2X system located outside the host vehicle 2. The communication system 5 of the V2X type may be at least one of a dedicated short range communications (i.e., DSRC) communication device, a cellular V2X (i.e., C-V2X) communication device, or the like. The communication system 5 may have a positioning type system that receives a positioning signal from an artificial satellite of a global navigation satellite system (i.e., GNSS) located outside the host vehicle 2. For example, the communication system 5 of the positioning type may be a GNSS receiver or the like. The communication system 5 may have a terminal communication type system that can transmit and receive a communication signal to and from a terminal located in the internal environment of the host vehicle 2. For example, the communication system 5 of the terminal communication type may be at least one of a Bluetooth (registered trademark) device, a Wi-Fi (registered trademark) device, an infrared communication device, or the like.

The information presentation system 6 presents notification information to the passenger of the host vehicle 2. The information presentation system 6 may be of a visual stimulation type that stimulates the passenger's vision through a display. The visual stimulus type information presentation system 6 is at least one type of, for example, a head-up display (i.e., HUD), a multi function display (i.e., MFD), a combination meter, a navigation unit, and the like. The information presentation system 6 may be of an auditory stimulation type that stimulates the auditory sense of the passenger by sound. The auditory stimulation type information presentation system 6 is, for example, at least one of a speaker, a buzzer, a vibration unit, and the like.

The recognition system 1 is connected to the sensor system 4, the communication system 5, and the information presentation system 6 via at least one of, for example, a local area network (i.e., LAN) line, a wire harness, an internal bus, or a wireless communication line. The recognition system 1 includes at least one dedicated computer.

The dedicated computer constituting the recognition system 1 may be a recognition control ECU (i.e., Electronic Control Unit) that controls object recognition in the scanning space 30 based on the scanning data Ds by the scanning device 3. Here, the recognition control ECU may have a function of integrating sensor information from multiple external sensors 40 including the scanning device 3. The dedicated computer constituting the recognition system 1 may be a driving control ECU that is responsible for driving control of the host vehicle 2. The dedicated computer constituting the recognition system 1 may be a navigation ECU that navigates the travel route of the host vehicle 2. The dedicated computer constituting the recognition system 1 may be a locator ECU that estimates a self-state amount including a self-position of the host vehicle 2. The dedicated computer constituting the recognition system 1 may be an HCU (i.e, Human Machine Interface Control Unit or HMI Control Unit) that controls information presentation by the information presentation system 6 in the host vehicle 2. The dedicated computer constituting the recognition system 1 may be a computer other than the host vehicle 2, which constitutes an external information center or a mobile terminal capable of communicating with the communication system 5, for example.

The dedicated computer constituting the recognition system 1 includes at least one memory 10 and at least one processor 12. The memory 10 is at least one type of non-transitory tangible storage medium of, for example, a semiconductor memory, a magnetic medium, and an optical medium, for non-transitory storing computer readable programs, data, and the like. For example, the processor 12 may include, as a core, at least one of a central processing unit (i.e., CPU), a graphics processing unit (i.e., GPU), a reduced instruction set computer (i.e., RISC) CPU, a data flow processor (i.e., DFP), a graph streaming processor (i.e., GSP), or the like.

In the recognition system 1, a memory 10 stores map information that can be used for driving control of a host vehicle 2. For example, the memory 10 acquires and stores the latest map information through communication with an external information center via the communication system 5 of the V2X type. In particular, the map information in the first embodiment is map data Dm (see FIG. 3), such as a high-precision map or a dynamic map, which represents the driving environment of the host vehicle 2 in three dimensions. Such map data Dm represents the state of a mapping point group obtained by mapping objects at fixed positions that exist in the driving environment of the host vehicle 2. The map data Dm includes three-dimensional state values relating to at least one of the position coordinates, the distance, the azimuth angle, and the shape of a target object. The objects mapped in the map data Dm are, for example, multiple types of objects located at at least fixed points among roads, traffic signs, traffic lights, structures, railroad crossings, vegetation, space division objects, space division lines, and marking lines.

Figure 3:
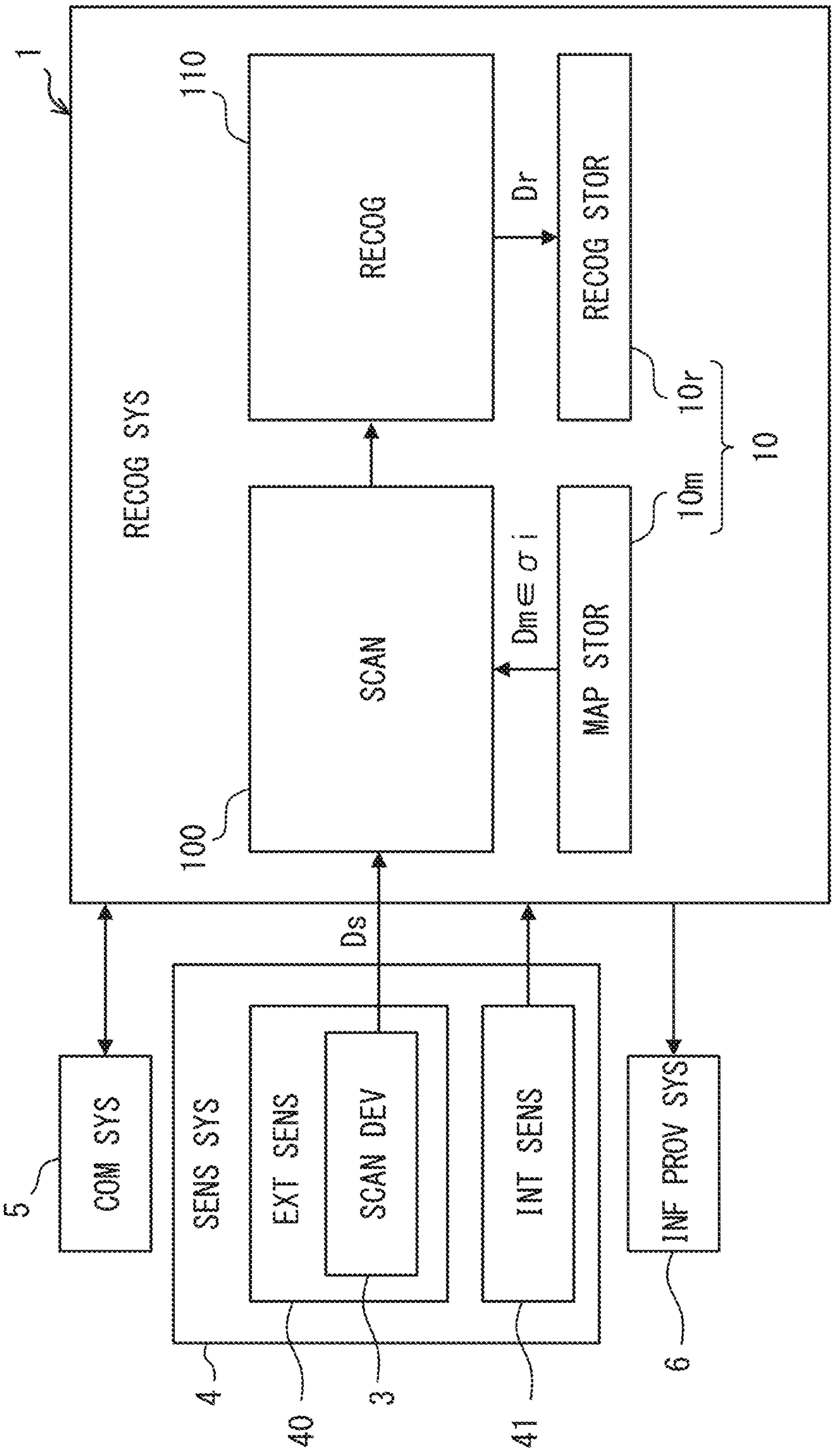
FIG. 3 is a block diagram illustrating a functional configuration of the recognition system according to the first embodiment.

In the recognition system 1, the processor 12 executes a number of instructions included in a recognition program stored in the memory 10 in order to recognize a target moving object Ot in a scanning space 30 by the scanning device 3 of the host vehicle 2. As a result, the recognition system 1 constructs multiple functional blocks for recognizing the target moving object Ot in the scanning space 30. The plurality of functional blocks constructed in the recognition system 1 include a scanning block 100 and a recognition block 110 as shown in FIG. 3.

The flow of a recognition method (hereinafter, referred to as a recognition flow) in which the recognition system 1 recognizes a target moving object Ot in the scanning space 30 by cooperation of these blocks 100 and 110 will be described below with reference to FIG. 4. The algorithm cycle of the recognition flow is repeatedly executed during the activation of the host vehicle 2. Further, in this recognition flow, "S" means steps of the process executed by instructions included in the recognition program.

In S100, the scanning block 100 acquires from the scanning device 3 the scanning data Ds for the entire scanning space 30 according to the viewing angle. In this case, particularly in the recognition flow of the first embodiment, the scanning data Ds is acquired so as to include at least the three-dimensional distance and/or three-dimensional position coordinates of the scanning point group as state values observed for each of the multiple pixels in the scanning device 3.

Figure 5:
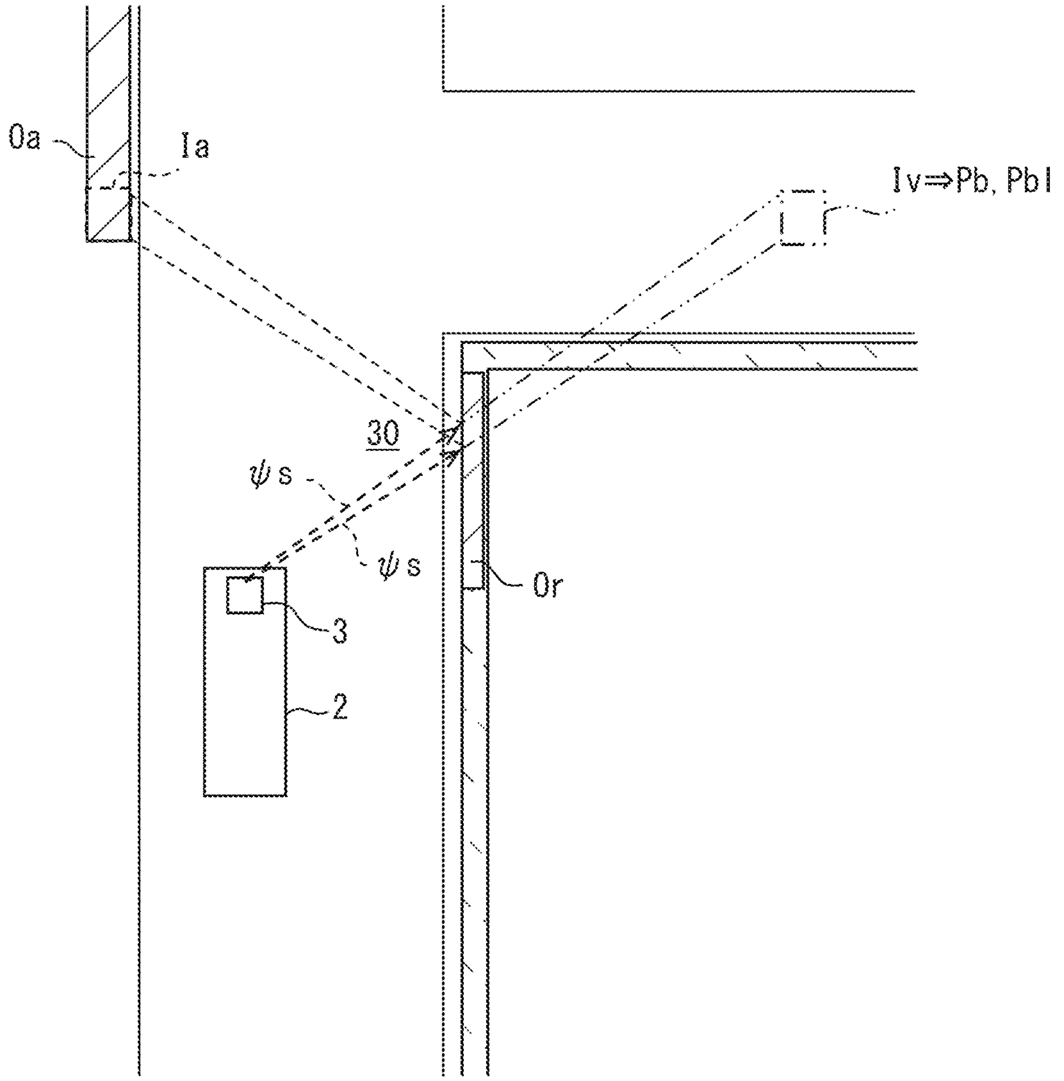
FIG. 5 is a schematic diagram of a plan view for illustrating the recognition flow according to the first embodiment.
Figure 6:
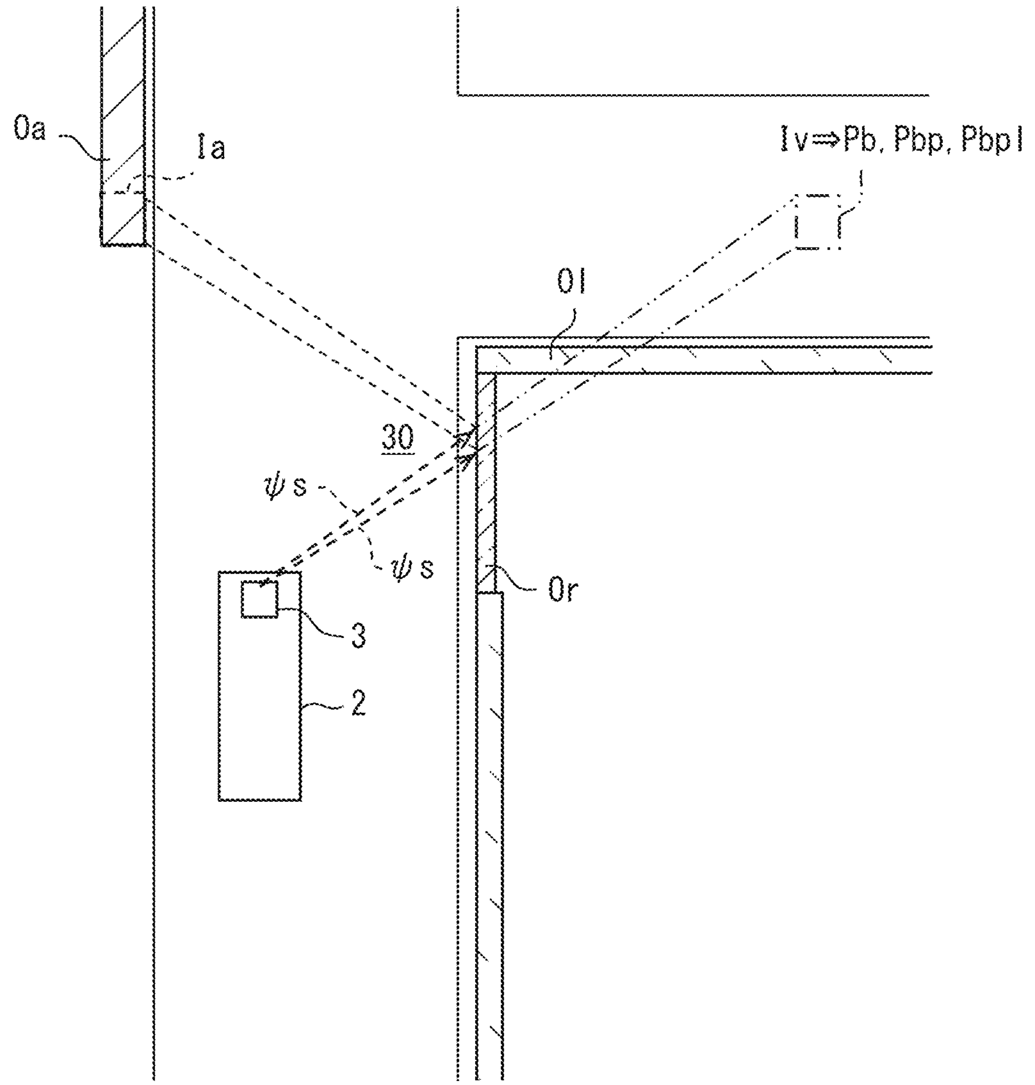
FIG. 6 is a schematic diagram of a plan view for illustrating the recognition flow according to the first embodiment.
Figure 7:
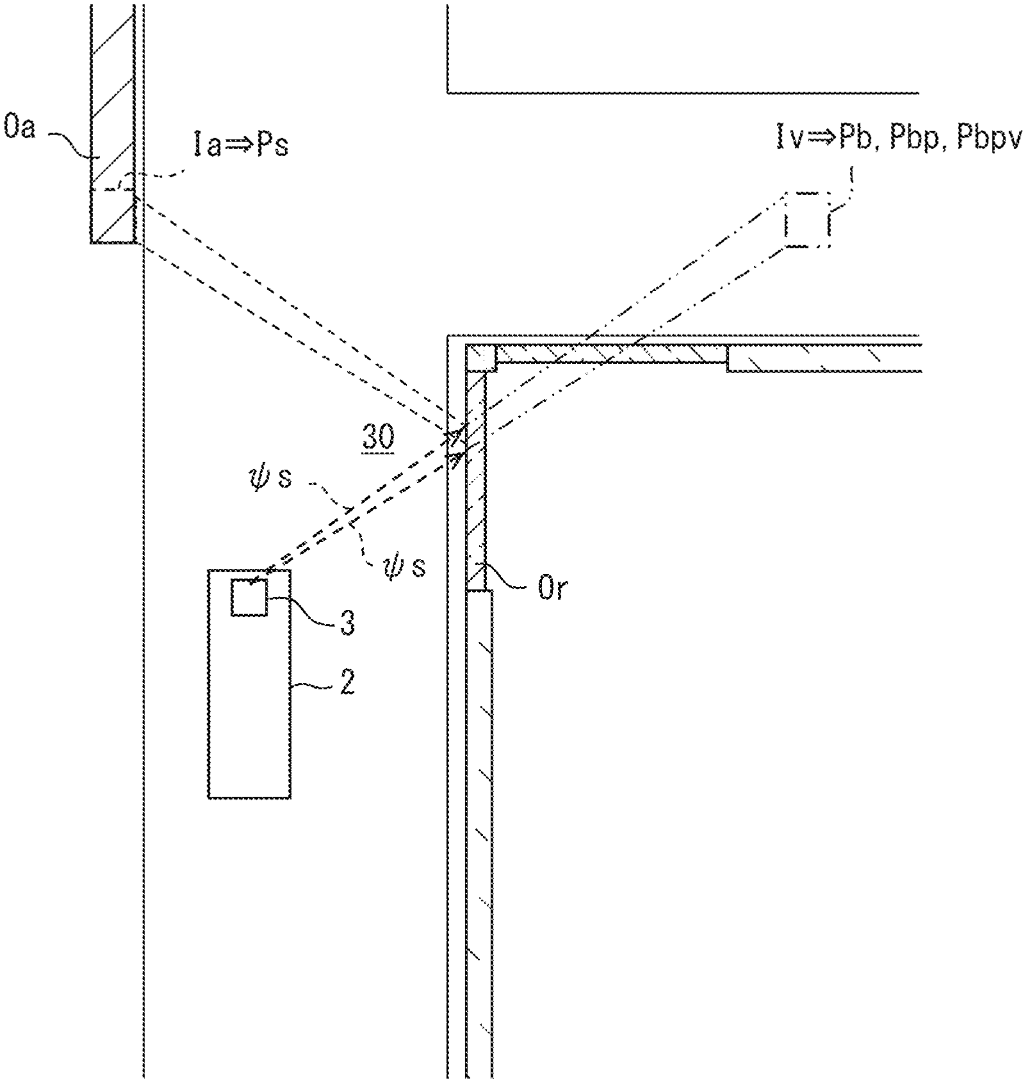
FIG. 7 is a schematic diagram of a plan view for illustrating the recognition flow according to the first embodiment.

In S101, the scanning block 100 specifies, in the scanning data Ds, the overall scanning direction (i.e., the irradiation direction of the irradiation light) ψs in which the reflector Or, among the objects existing in the scanning space 30, is scanned by the scanning device 3 as shown in FIGS. 5 to 8. In this case, the reflector Or is defined as an object at a fixed position that is disposed in a focus range in which the reflection characteristic with respect to the irradiation light is on the high reflection side. The focus range of the reflector Or indicates a range in which at least one of the reflection characteristics, such as the reflectance and the reflection intensity, is equal to or greater than the reflection threshold value or exceeds the reflection threshold value. Therefore, the focus range is set to the range of the reflection characteristic in which the scanning point group of the virtual image Iv is observed when the irradiation light is reflected by the reflector Or in a different direction from the scanning direction ψs, the reflection light is formed by reflecting the irradiation light in the different direction on another object Oa, and the reflection light on the other object Oa is reflected again on the reflector Or toward the scanning device 3, as shown in FIGS. 5 to 7.

In S101, the scanning block 100 reads out the map data Dm, to which identification information σi of an object existing in the scanning space 30 has been added, from the map storage area 10*m* of the memory 10 shown in FIG. 3, in order to identify the reflector Or as an identification target in the scanning direction ψs. At this time, particularly in the recognition flow of the first embodiment, the map data Dm including at least the three-dimensional distances and/or three-dimensional position coordinates of the mapping point group as the mapped state values is read out. Therefore, three-dimensional space information in connection with the identification information σi for each of a plurality of voxels 300 as described below may be read out as the map data Dm obtained from an infrastructure database of an infrastructure system (e.g., an external information center) that can communicate with the recognition system 1 via the communication system 5.

In the map data Dm as a read-out target in S101, the identification information σi is included as information for identifying the optical characteristics of an object in the scanning space 30 in association with the position coordinates of the object. In the first embodiment, the optical characteristics identified by the identification information σi include the above-described reflection characteristics as well as the transmission characteristics for the irradiation light. Therefore, the identification information σi is added to the map data Dm to indicate an object, such as a reflector Or, through which the transmission of irradiation light is permitted when at least one of the transmission characteristics, such as transmittance and transmission intensity, is equal to or higher than the transmission threshold or exceeds the transmission threshold. Furthermore, the identification information σi is added to the map data Dm so as to indicate an object, such as a reflector Or, for which the transmission of the irradiation light is restricted because at least one of the transmission characteristics is less than the transmission threshold value or equal to or smaller than the transmission threshold value.

The scanning block 100 in S101 specifies the scanning direction ψs in three dimensions along which the scanning device 3 scans the reflector Or as shown in FIGS. 5 to 8. At this time, the self-position of the host vehicle 2, which is the starting point of the scanning direction ψs in which the reflector Or is scanned, is estimated. The self-position is estimated based on at least one of the sensor information from an internal sensor 41 of a physical quantity detection type such as an inertial sensor, the communication information from a positioning type communication system 5, and the map data Dm.

Figure 4:
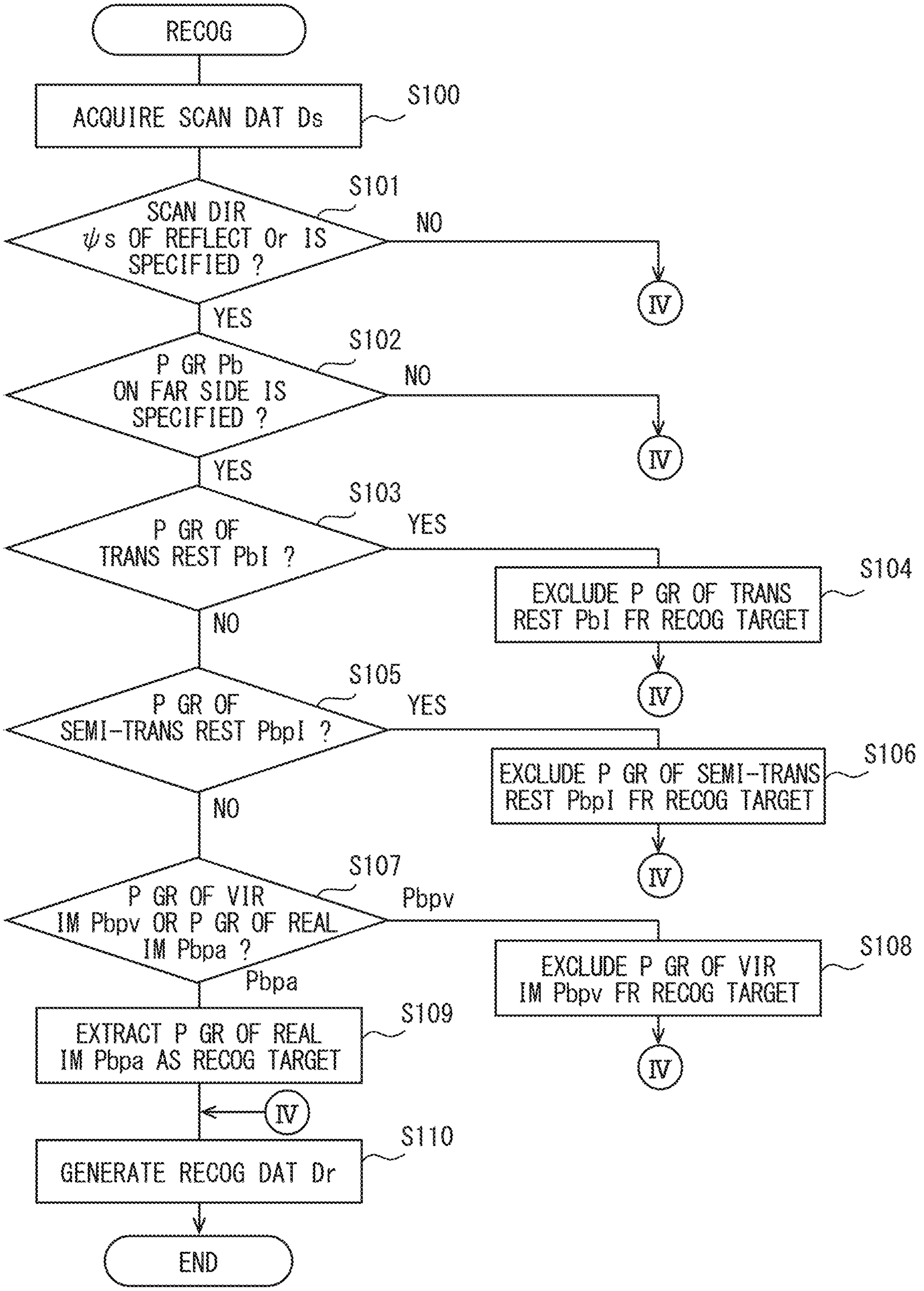
FIG. 4 is a flow chart illustrating a recognition flow according to the first embodiment.

In S101, the scanning block 100 determines whether or not the scanning direction ψs in which the reflector Or exists has been specified as shown in FIG. 4. As a result, when a positive determination is made, the recognition flow proceeds to S102.

In S102, the scanning block 100 specifies in the scanning data Ds a far side point group Pb as a scanning point group observed at a position further side (i.e., farther away) than the reflector Or as viewed from the scanning device 3 in the entire scanning direction ψs in which the reflector Or is scanned, as shown in FIGS. 5 to 8. At this time, the far side point group Pb is included in the scanning data Ds as a scanning point group whose distance from the scanning device 3 in the scanning direction ψs is farther than the reflector Or specified in S101.

In S102, the scanning block 100 determines whether or not the far side point group Pb has been specified as shown in FIG. 4. As a result, when a positive determination is made, the recognition flow proceeds to S103.

In S103, the recognition block 110 searches a transmission restriction point group Pbl from the scanning data Ds at a position on the far side of a reflector Or whose optical characteristic restricting the transmission of the irradiation light is represented by the identification information σi, as shown in FIG. 5. In this case, the transmission restriction point group Pbl is defined as a far side point group Pb farther from the scanning device 3 than the reflector Or where at least one type of transmission characteristics based on the identification information σi is less than or equal to the transmission threshold at a fixed position.

In S103, the scanning block 100 determines whether or not the far side point group Pb specified in S102 is the transmission restriction point group Pbl as shown in FIG. 4. As a result, if a positive determination is made, the recognition flow proceeds to S104, and the recognition block 110 excludes the transmission restriction point group Pbl, which is determined to be the scanning point group of the virtual image Iv as shown in FIG. 5, from the recognition target of the target moving body Ot. On the other hand, when a negative determination is made as shown in FIG. 4, the recognition flow proceeds to S105.

In S105, the recognition block 110 searches a semi-transmission restriction point group Pbpl from the scanning data Ds under a condition that the transmission permission point group Pbp is disposed on the far side of the reflector Or and has the optical characteristics indicated by the identification information σi such that the transmission of the irradiation light is permitted as shown in FIG. 6. In this case, the transmission permission point group Pbp is defined as a far side point group Pb farther from the scanning device 3 than the reflector Or where at least one type of transmission characteristics based on the identification information σi is more than or equal to the transmission threshold or exceeds the transmission threshold at a fixed position. Therefore, the semi-transmission restriction point group Pbpl is defined as the far side point group Pb in the transmission permission point group Pbp, which is farther from the scanning device 3 than the fixed-point object Ol which is disposed at a fixed-point position on the far side of the reflector Or, and has at least one type of transmission characteristics based on the identification information σi is less than the transmission threshold or equal to or less than the transmission threshold. That is, the semi-transmission restriction point group Pbpl is a far side point group Pb that is identified as being disposed at a far side position of a fixed object Ol whose identification information σi represents the optical characteristics that restrict further transmission of the irradiation light that has transmitted through the reflector Or.

In S105, the scanning block 100 determines whether or not the far side point group Pb specified in S102 is the semi-transmission restriction point group Pbpl as shown in FIG. 4. As a result, if a positive determination is made, the recognition flow proceeds to S106, and the recognition block 110 excludes the semi-transmission restriction point group Pbpl, which is determined to be the scanning point group of the virtual image Iv as shown in FIG. 6, from the recognition target of the target moving body Ot. On the other hand, when a negative determination is made as shown in FIG. 4, the recognition flow proceeds to S107.

Figure 8:
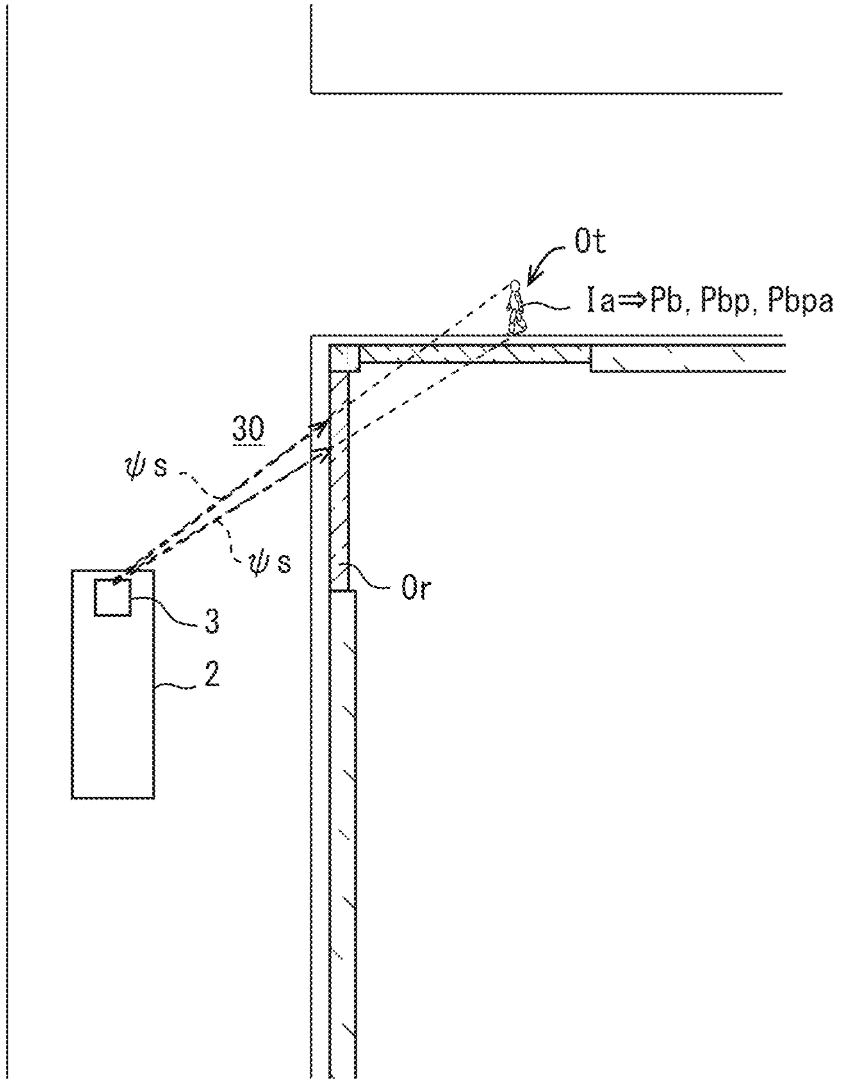
FIG. 8 is a schematic diagram of a plan view for illustrating the recognition flow according to the first embodiment.

In S107, the recognition block 110 searches a virtual image point group Pbpv and a real image point group Pbpa from the scanning data Ds, as a transmission permission point group Pbp which is disposed on the far side of the reflector Or, and has the optical characteristics indicated by the identification information σi and permitting the transmission of the irradiation light as shown in FIGS. 7 and 8. At this time, as shown in FIGS. 7 and 9, the virtual image point group Pbpv is defined as a scanning point group of the real image Ia that generates the virtual image Iv to be appeared at a position on the fare side position of the transmission permission reflector Or, and as a far side point group Pb, in which a symmetrical point group Ps exists in a symmetrical area As that satisfies symmetry with the far side position relative to the reflector Or within the search range.

Figure 10:
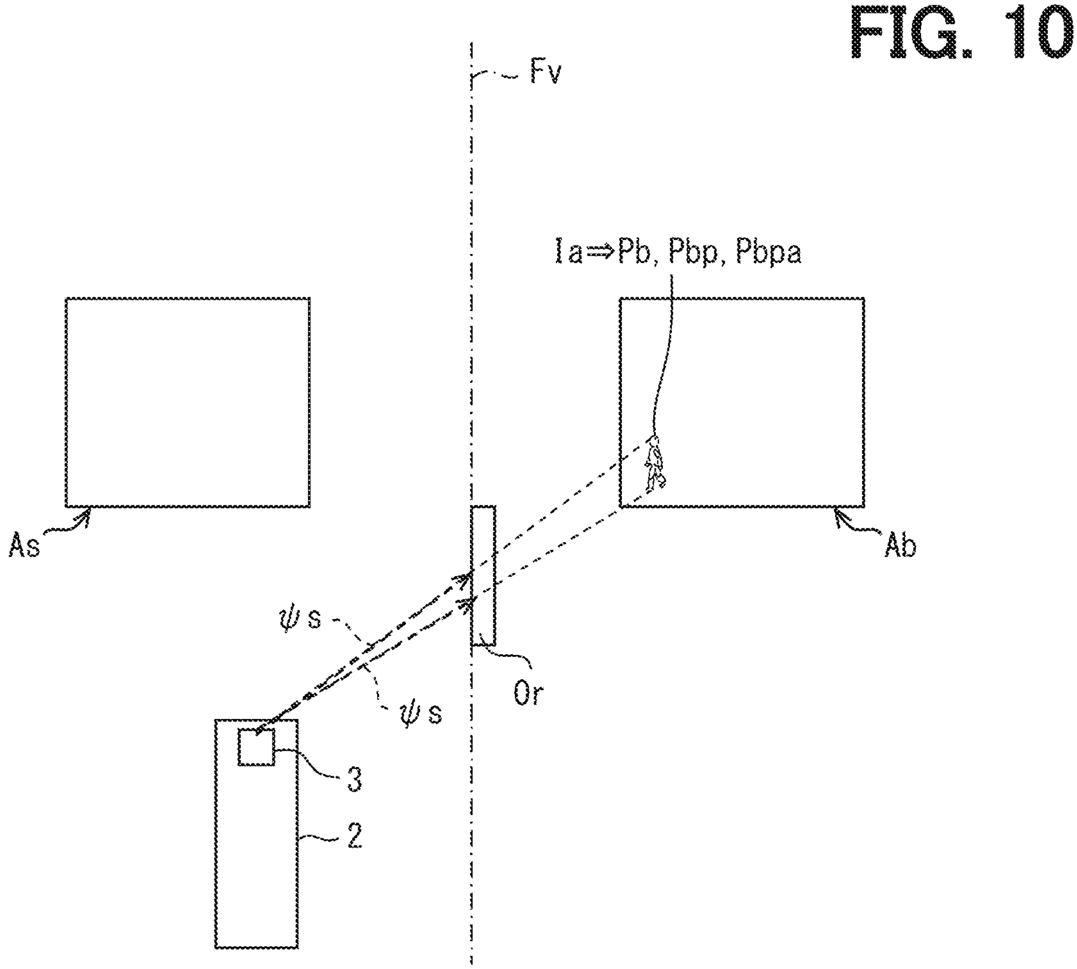
FIG. 10 is a schematic diagram of a plan view for illustrating the recognition flow according to the first embodiment.

On the other hand, as shown in FIGS. 8 and 10, the real image point group Pbpa is defined as a far side point group Pb in which the symmetrical point group Ps does not exist in a symmetrical area As that satisfies symmetry with the far side position relative to the transmission permission reflector Or within the search range.

Figure 9:
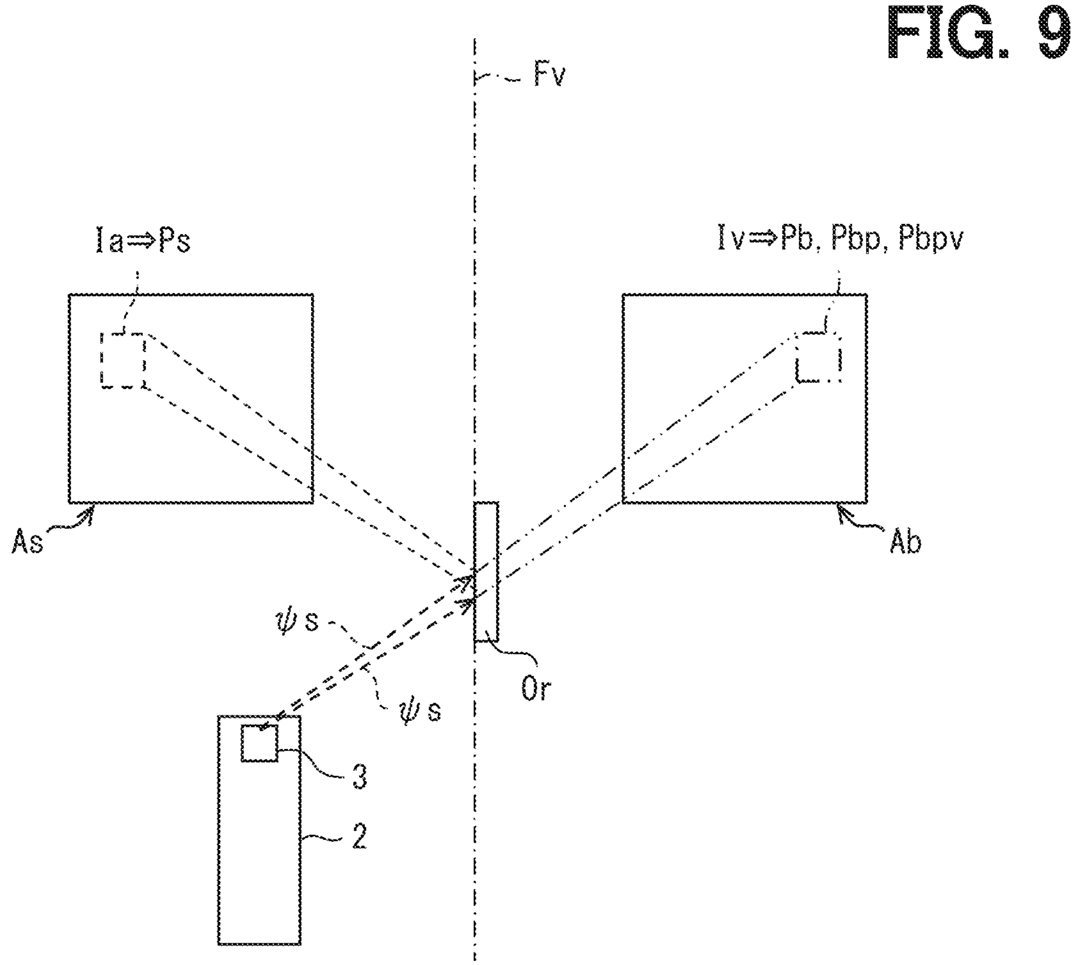
FIG. 9 is a schematic diagram of a plan view for illustrating the recognition flow according to the first embodiment.

Therefore, as shown in FIGS. 9 and 10, the point groups Pbpv and Pbpa are distinguished based on the presence or absence of a symmetrical point group Ps within the search range of a symmetrical area As that includes a plane-symmetrical position with the transmission permission point group Pbp under a condition that the virtual plane Fv perpendicular to a normal line passing through a point in the scanning direction ψs on the reflection surface of the reflector Or is defined as a symmetrical plane. At this time, the search range in which the symmetrical point group Ps is searched as the outermost range of the symmetrical area As is set taking into consideration at least one of the scanning error in S100 and the self-position estimation error in S101, for example. The search for such a symmetrical point group Ps is performed on the scanning point group included in the scanning data Ds for the entire scanning space 30, Alternatively, if at least a part of the symmetrical area As is disposed outside the scanning space 30, the mapping point group of the map data Dm may be replaced with the scanning point group.

Figure 11:
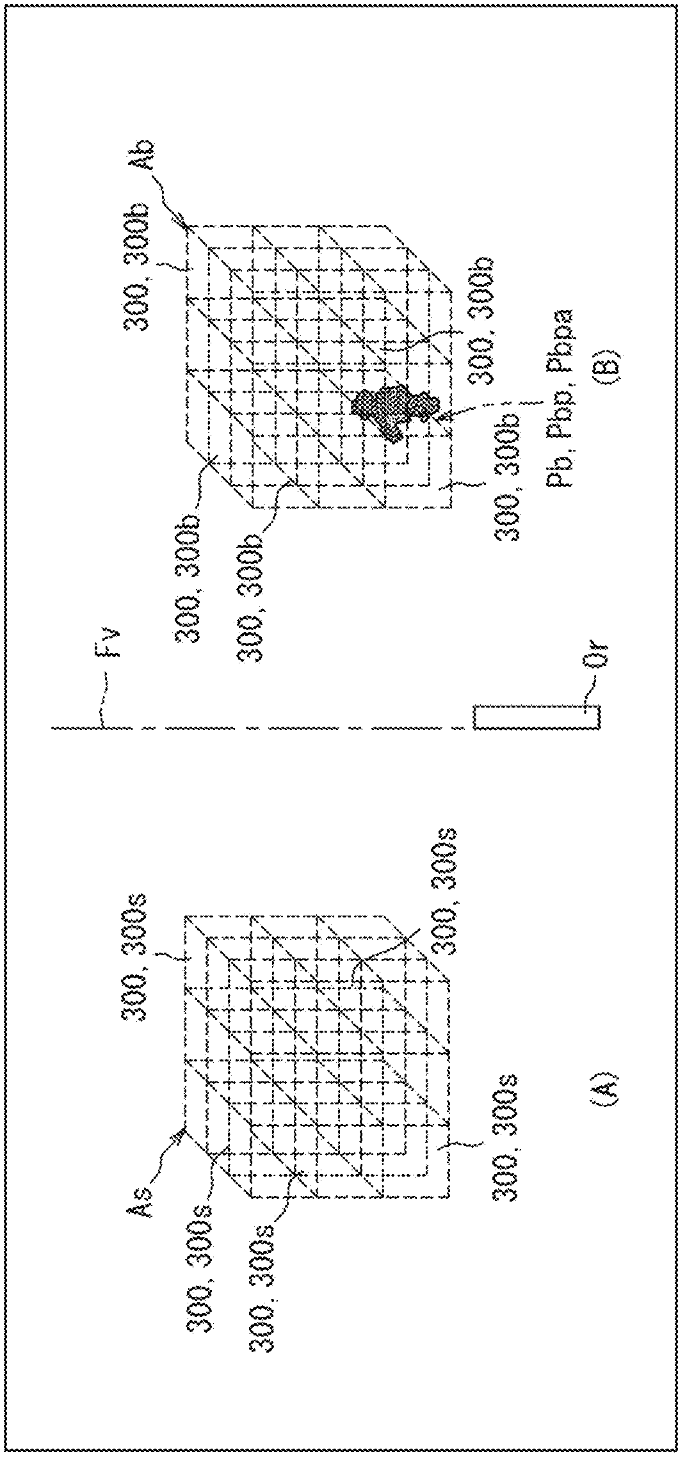
FIG. 11 is a schematic diagram of a perspective view for illustrating the recognition flow according to the first embodiment.
Figure 12:
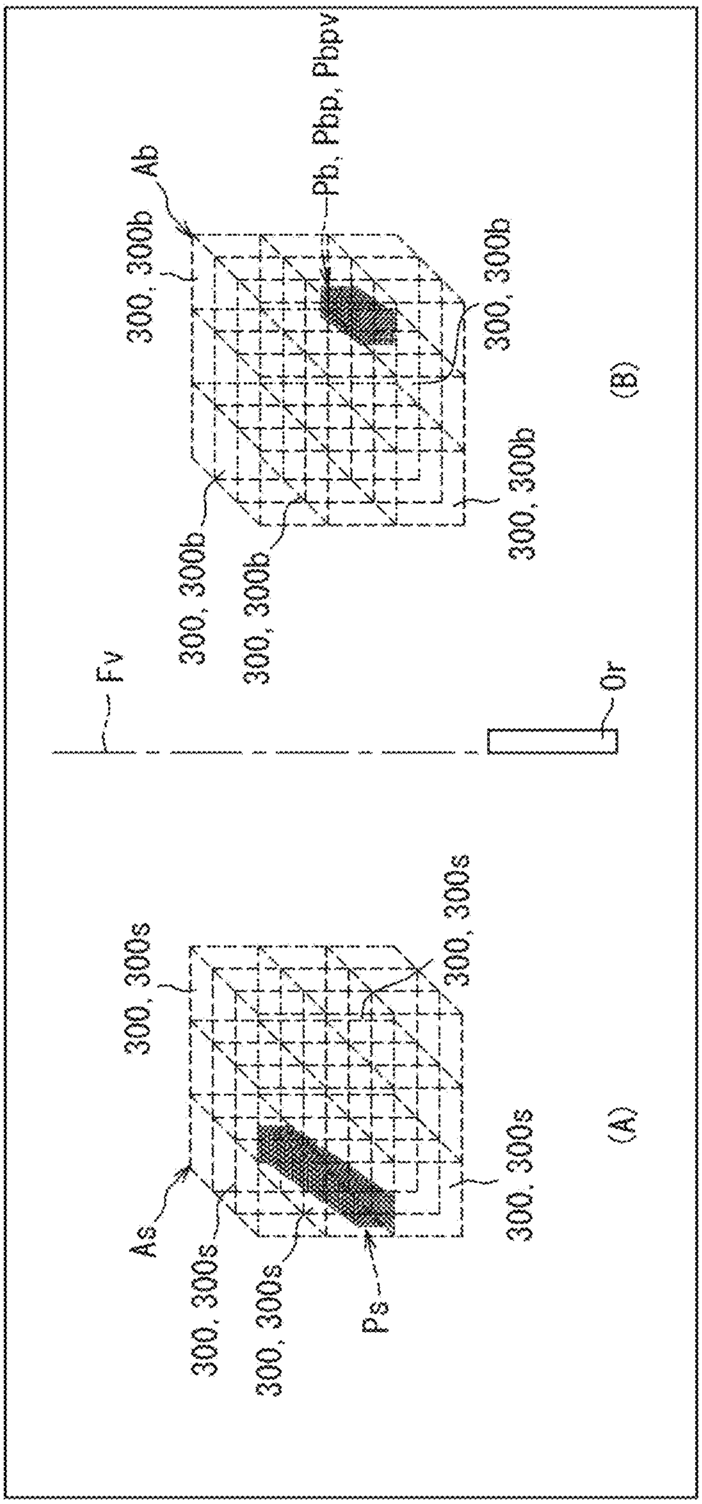
FIG. 12 is a schematic diagram of a perspective view for illustrating the recognition flow according to the first embodiment.

The recognition block 110 in S107 sets a three-dimensional far side area Ab in the scanning space 30 for distinguishing the point groups Pbpv and Pbpa with respect to a three-dimensional symmetrical area As in which the symmetrical point group Ps is searched for, as shown in FIGS. 11 and 12. In this case, the far side area Ab and the symmetrical area As may be substantially the same size so as to have a plane-symmetrical positional relationship with respect to the transmission permission reflector Or (specifically, the imaginary surface Fv). Therefore, in S107, the recognition block 110 further divides each of the far side area Ab and the symmetrical area As into a plurality of three-dimensional voxels 300. Each of these voxels 300 is defined in a three-dimensional lattice space with a cube or a rectangular parallelepiped having six sides along three-dimensional absolute coordinate axes assigned to the scanning space 30. In the following, each voxel 300 in the far side area Ab will be referred to as a far side voxel **300*b*, while each voxel 300 in the symmetrical area As will be referred to as a symmetrical voxel 300*s***.

The recognition block 110 in S107 compares the voxels **300*b* and 300*s* having a plane symmetric relationship with each other. The comparison at this time is based on the similarity of the point group distribution between the scanning point groups in each of the far side voxel 300*b* to which the transmission permission point group Pbp as the far side point group Pb and the symmetrical voxel 300*s* in which the symmetrical point group Ps is searched. Therefore, the similarity between the far side voxel 300*b* and the symmetrical voxel 300*s*** is calculated using at least one of the Iterative Closest Point (i.e., ICP) algorithm, the Mahalanobis distance, and the Signature of Histograms of Orientations (i.e., SHOT) feature amount, for example.

In S107, if the similarity between the far side voxel **300*b* and the symmetrical voxel 300*s* falls within the allowable range, i.e., if it is determined that the voxels 300*b*, 300*s* are similar to each other within the allowable range, the transmission permission point group Pbp is determined to be the virtual image point group Pbpv in which the symmetrical point group Ps exists, as shown in FIGS. 7, 9, and 12. On the other hand, if the similarity between the far side voxel 300*b* and the symmetrical voxel 300*s* falls outside the allowable range, i.e., if the voxels 300*b* and 300*s* are determined to be dissimilar, the transmission permission point group Pbp is determined to be a real image point group Pbpa in which the symmetrical point group Ps does not exist, as shown in FIGS. 8, 10, and 11**.

Figure 13:
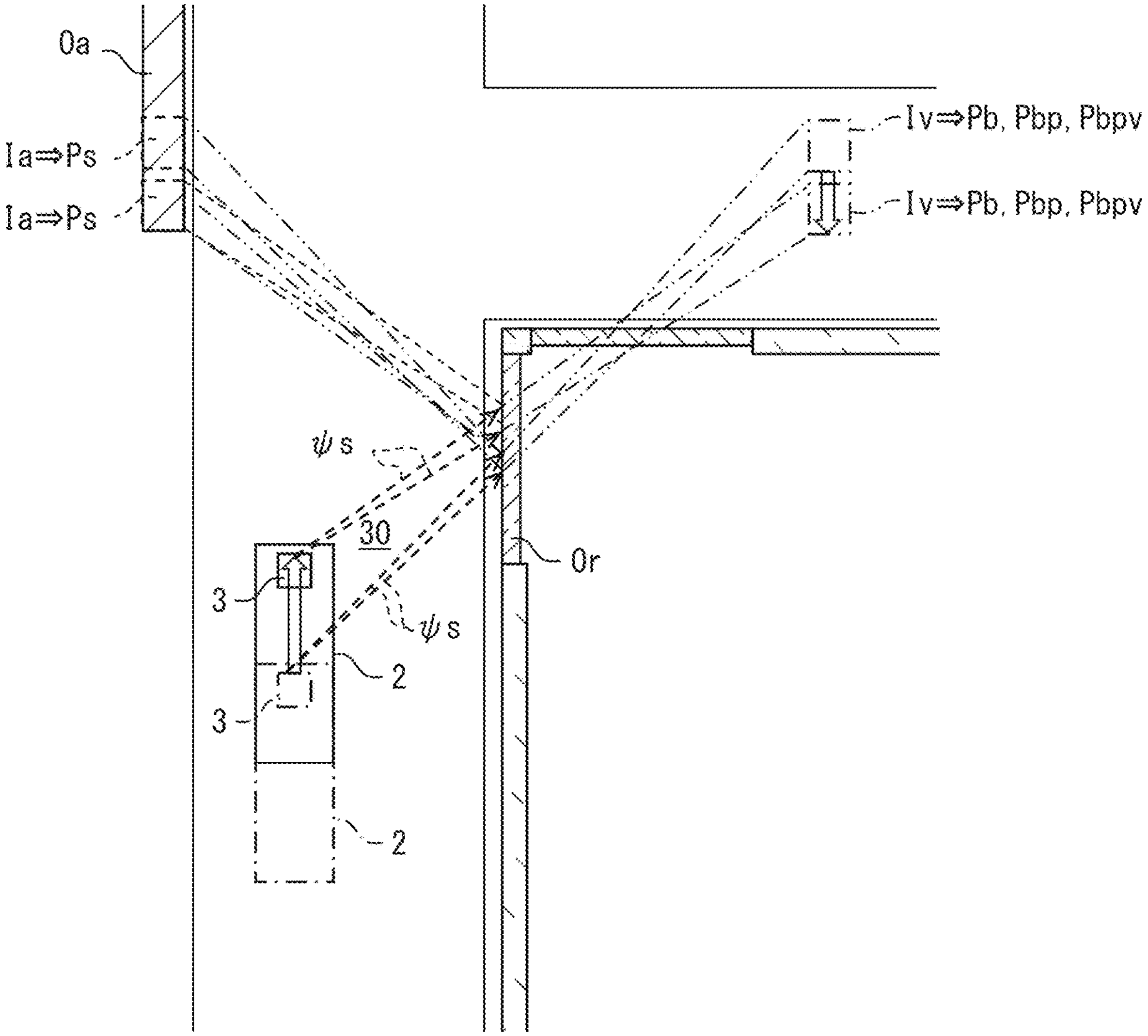
FIG. 13 is a schematic diagram of a plan view for illustrating the recognition flow according to the first embodiment.

The recognition block 110 in S107 may further perform data analysis on the transmission permission point group Pbp belonging to the far side voxel **300*b* that is determined to be similar to the symmetrical voxel 300*s*, thereby improving the distinction accuracy of the point groups Pbpv and Pbpa. In this data analysis, for example, after a clustering process based on the distance between points and the normal direction of each point, the speed and the traveling direction are estimated by a tracking process using an extended Kalman filter for the same cluster. Based on the results of this data analysis, the recognition block 110 specifies the transmission permission point group Pbp, which moves in the opposite direction to the host vehicle 2 at a relative speed (hereinafter simply referred to as the focus relative speed) focused depending on the traveling speed of the host vehicle 2, as shown in FIG. 13, as the true virtual image point group Pbpv. In response to this, the recognition block 110 specifies each of the transmission permission point group Pbp that moves in the opposite direction to the host vehicle 2 at a speed deviated from the focus relative speed and the transmission permission point group Pbp that moves in the same direction as the host vehicle 2**, as false virtual image point group Pbpv so that they are specified as the real image point group Pbpa.

Here, the focus relative speed, which is the distinction criterion for the point groups Pbpv and Pbpa, is defined as the speed difference between the traveling speed of the host vehicle 2 measured by the speed sensor serving as the internal sensor 41 and the estimation speed of the transmission permission point group Pbp measured by the tracking process. Therefore, the transmission permission point group Pbp, in which the focus relative speed of the movement in the opposite direction to the host vehicle 2 is less than the speed threshold or equal to or less than the speed threshold, is determined to be the virtual image point group Pbpv.

The recognition block 110 in S107 determines whether the far side point group Pb specified in S102 is the virtual image point group Pbpv or the real image point group Pbpa, as shown in FIG. 4. As a result, if a determination is made that the far side point group Pb is a virtual image point group Pbpv, the recognition flow proceeds to S108, and the recognition block 110 excludes the virtual image point group Pbpv, which is determined to be the scanning point group of the virtual image Iv, from the recognition target of the target moving body Ot, as shown in FIG. 7. On the other hand, if a determination is made that the far side point group Pb is the real image point group Pbpa, as shown in FIG. 4, the recognition flow proceeds to S109, and the recognition block 110 extracts the real image point group Pbpa, which is determined to be the scanning point group of the real image Ia as the recognition target for the target moving object Ot, as shown in FIG. 8.

After any of S104, S106, S108, and S109 is executed, the recognition flow proceeds to S110. Even if a negative determination is made in each of S101 and S102, the recognition flow proceeds to S110. In S110, the recognition block 110 performs the recognition process by excluding the far side point group Pb, which is determined to be outside the recognition target in the previous step among the transmission restriction point group Pbl, the semi-transmission restriction point group Pbpl, and the virtual image point group Pbpv, from the recognition target in the scanning data Ds. In this case, the recognition process may use a machine learning model such as Point Pillars, or a background subtraction method using the map data Dm.

The recognition block 110 in S110 generates the recognition data Dr representing the results of this recognition process. At this time, if the real image point group Pbpa is determined to be the recognition target in the immediately preceding step S109, the recognition data Dr that recognizes the target moving object Ot represented by the real image point group Pbpa is generated. The recognition block 110 in S110 further stores the generated recognition data Dr in a recognition storage area 10*r* of the memory 10 shown in FIG. 3. The stored recognition data Dr is used, for example, for driving control of the host vehicle 2.

The recognition block 110 in S110 may control the display of the generated or stored recognition data Dr by the information display system 6 in the host vehicle 2. In the recognition data Dr displayed at this time, the far side point group Pb that is not the recognition target may be controlled not to be displayed, or the far side point group Pb that is not the recognition target may be displayed along with a warning label such as “virtual image”. The recognition block 110 in S110 may control the transmission of the generated or stored recognition data Dr from the host vehicle 2 to an external source (e.g., an external information center or another vehicle) via the communication system 5. Then, the current execution of the recognition flow ends.

(Effect and Advantage)

The operation effects of the first embodiment will be described below.

In the first embodiment, in the scanning direction ψs of the scanning device 3 scanning a reflector Or in a focus range on the high reflection side of the reflection characteristics with respect to the irradiation light, the scanning data Ds is acquired that includes a far side point group Pb as a scanning point group at a position on the far side of the reflector Or. Therefore, according to the first embodiment, the recognition data Dr is generated by excluding the far side point group Pb that corresponds to the symmetrical point group Ps disposed in the symmetrical area As of the far side position with respect to the reflector Or as the scan point group of the real image Ia that generates the virtual image Iv to be appeared at a far side position of the reflector Or, from the far side point group Pb in the scanning data Ds as the recognition target of the target moving object Ot. According to this, the far side point group Pb observed as a virtual image Iv of the symmetrical point group Ps at the far side position of the reflector Or can be excluded from the recognition target of the target moving object Ot, while the far side point group Pb observed as a real image Ia at the far side position of the reflector Or can be properly recognized as the target moving object Ot. Therefore, it is possible to suppress erroneous recognition caused by the occurrence of the virtual image Iv and improve the recognition accuracy of the target moving object Ot.

According to the first embodiment, scanning data Ds including the far side point group Pb is acquired at a far side position of the reflector Or specified based on the identification information σi read from the memory 10 as information included in the map data Dm to identify an object disposed in the scanning space 30. This makes it possible to appropriately narrow down candidates for the far side point group Pb observed as a virtual image Iv due to the reflector Or of the symmetrical point group Ps based on the identification information σi. Therefore, it is possible to increase the speed of the processing required to suppress erroneous recognition caused by the generation of the virtual image Iv as much as possible while improving the recognition accuracy of the target moving object Ot.

According to the first embodiment, the far side point group Pb, which corresponds to the symmetric point group Ps disposed in the symmetrical area As with respect to the far side position of the reflector Or, whose optical characteristics is indicated by the identification information σi such that the transmission of the irradiation light is permitted, is excluded from the recognition target. According to this, the far side point group Pb observed at the far side position of the reflector Or as a virtual image Iv of the symmetrical point group Ps can be excluded from the recognition target of the target moving object Ot in accordance with the search for the symmetrical point group Ps when the transmission of the irradiation light through the reflector Or is permitted. Therefore, it is possible to suppress erroneous recognition caused by the occurrence of the virtual image Iv and improve the recognition accuracy of the target moving object Ot.

According to the first embodiment, the far side point group Pb located at the far side position of the reflector Or, whose optical characteristics is indicated by the identification information σi such that the transmission of the irradiation light is permitted, and located at the fare side position of the fixed object Ol, whose optical characteristics is indicated by the identification information σi such that the transmission of the irradiation light is restricted. According to this, the far side point group Pb observed at the far side position of the reflector Or as a virtual image Iv of the symmetrical point group Ps can be excluded from the recognition target of the target moving object Ot depending on the identification of a fixed object Ol that restricts the transmission of the irradiation light, even if the reflector Or permits the transmission of the irradiation light. Therefore, it is possible to increase the speed of the processing required to suppress erroneous recognition caused by the generation of the virtual image Iv as much as possible while improving the recognition accuracy of the target moving object Ot.

According to the first embodiment, the far side point group Pb located on the far side of the reflector Or, whose optical characteristics is indicated by the identification information σi such that the transmission of the irradiation light is restricted, is excluded from the recognition target. According to this, the far side point group Pb observed at a far side position of the reflector Or as a virtual image Iv of the symmetrical point group Ps can be excluded from the recognition target of the target moving object Ot depending on the identification of the reflector Or that restricts the transmission of the irradiation light. Therefore, it is possible to increase the speed of the processing required to suppress erroneous recognition caused by the generation of the virtual image Iv as much as possible while improving the recognition accuracy of the target moving object Ot.

In the first embodiment, as a plurality of three-dimensional voxels 300 obtained by dividing the scanning space 30, a far side voxel 300*b* to which the far side point group Pb belongs, and a symmetrical voxel 300*s* in which the symmetric point group Ps is searched for are defined. Therefore, according to the first embodiment, the far side point group Pb belonging to the far side voxel 300*b* whose point group distribution is similar to the symmetrical voxel 300*s* within the allowable range is excluded from the recognition target. This makes it possible to accurately specify the far point group Pb, to which the virtual image Iv of the symmetric point group Ps caused by the reflector Or is observed, based on the similarity of the point group distribution within the local range of voxels **300*b* and 300*s***. Therefore, it is possible to improve the reliability in suppressing erroneous recognition caused by the generation of the virtual image Iv, and ultimately the reliability in highly accurate recognition of the target moving object Ot.

According to the first embodiment, the far side point group Pb, which moves in the opposite direction to the host vehicle 2 at a relative speed corresponding to the traveling speed of the host vehicle 2, is excluded from the recognition target. According to this, the far side point group Pb, to which the virtual image Iv of the symmetrical point group Ps caused by the reflector Or is observed, can be accurately specified based on the relative speed and the moving direction of the far side point group Pb with respect to the host vehicle 2. Therefore, it is possible to improve the reliability in suppressing erroneous recognition caused by the generation of the virtual image Iv, and ultimately the reliability in highly accurate recognition of the target moving object Ot.

Second Embodiment

A second embodiment is a modification example of the first embodiment.

Figure 14:
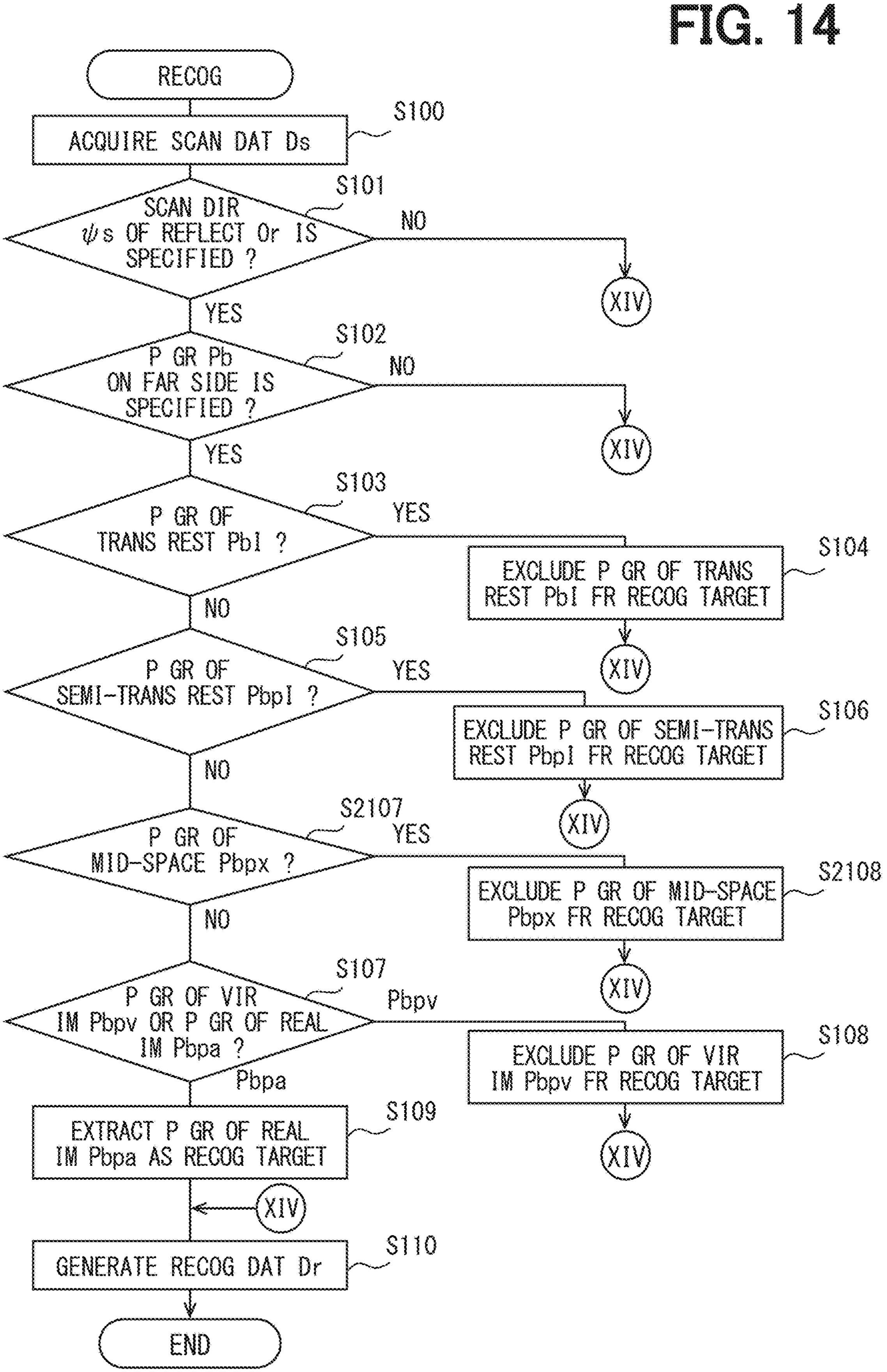
FIG. 14 is a flow chart illustrating a recognition flow according to the second embodiment.
Figure 15:
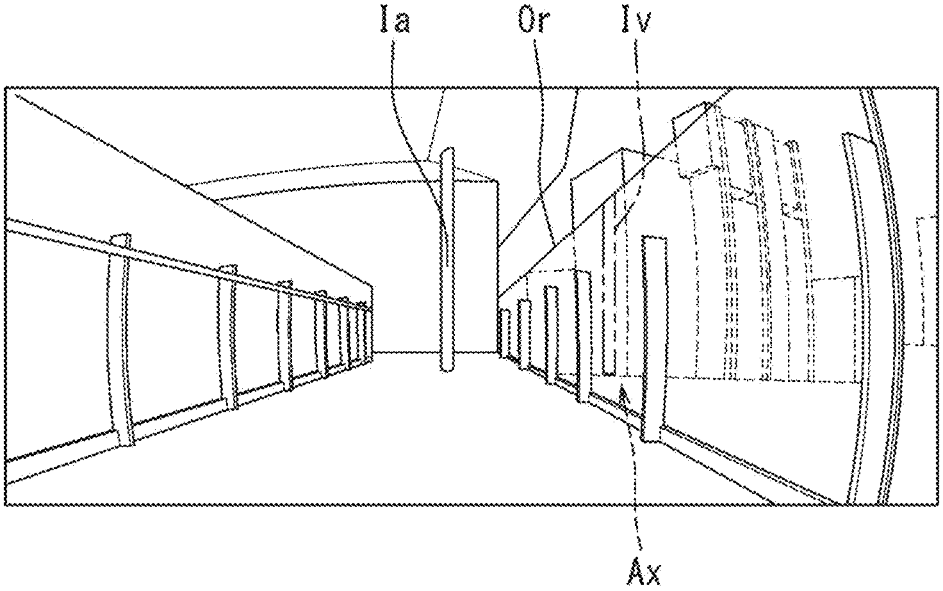
FIG. 15 is a schematic diagram of a perspective view for illustrating the recognition flow according to the second embodiment.

As shown in FIG. 14, in the recognition flow of the second embodiment, if a negative determination is made in S105, the process proceeds to S2107. In S2107, the recognition block 110 searches for the space point group Pbpx as the transmission permission point group Pbp located on the far side of the reflector Or represented by the identification information σi (see FIG. 3 of the first embodiment) which indicates optical characteristics that the transmission of the irradiation light is permitted. At this time, in the second embodiment, the space point group Pbpx is searched based on information the identification information σi included in the map data Dm that identifies the three-dimensional position coordinates of the space area Ax that is located at a far side position of the reflector Or, as shown in FIG. 15. In other words, the space point group Pbpx to be searched is defined as the scanning point group of the virtual image Iv with respect to the real image Ia, the far side point group Pb that exists in the space area Ax represented by the identification information σi among positions on the far side of the reflector Or.

As shown in FIG. 14, if a positive determination is made in S2107, in the second embodiment, the recognition flow proceeds to S2108, and the recognition block 110 excludes the space point group Pbpx from the recognition target of the target moving object Ot, and then, executes S110. On the other hand, if a negative determination is made in S2107, the recognition flow proceeds to S107, and the transmission permission point group Pbp, excluding the semi-transmission restriction point group Pbpl and the space point group Pbpx, is determined to be either the virtual image point group Pbpv or the real image point group Pbpa, as in the first embodiment.

In this manner, according to the second embodiment, among the positions on the far side of the reflector Or, the far side point group Pb existing in the space area Ax represented by the identification information σi is excluded from the recognition target. According to this, the far side point group Pb, which is observed at a far side position of the reflector Or as a virtual image Iv of the symmetrical point group Ps, can be excluded from the recognition target of the target moving object Ot depending on the identification of its location in the space area Ax. Therefore, it is possible to suppress erroneous recognition caused by the occurrence of the virtual image Iv and improve the recognition accuracy of the target moving object Ot.

Third Embodiment

A third embodiment is another modification of the first embodiment.

Figure 16:
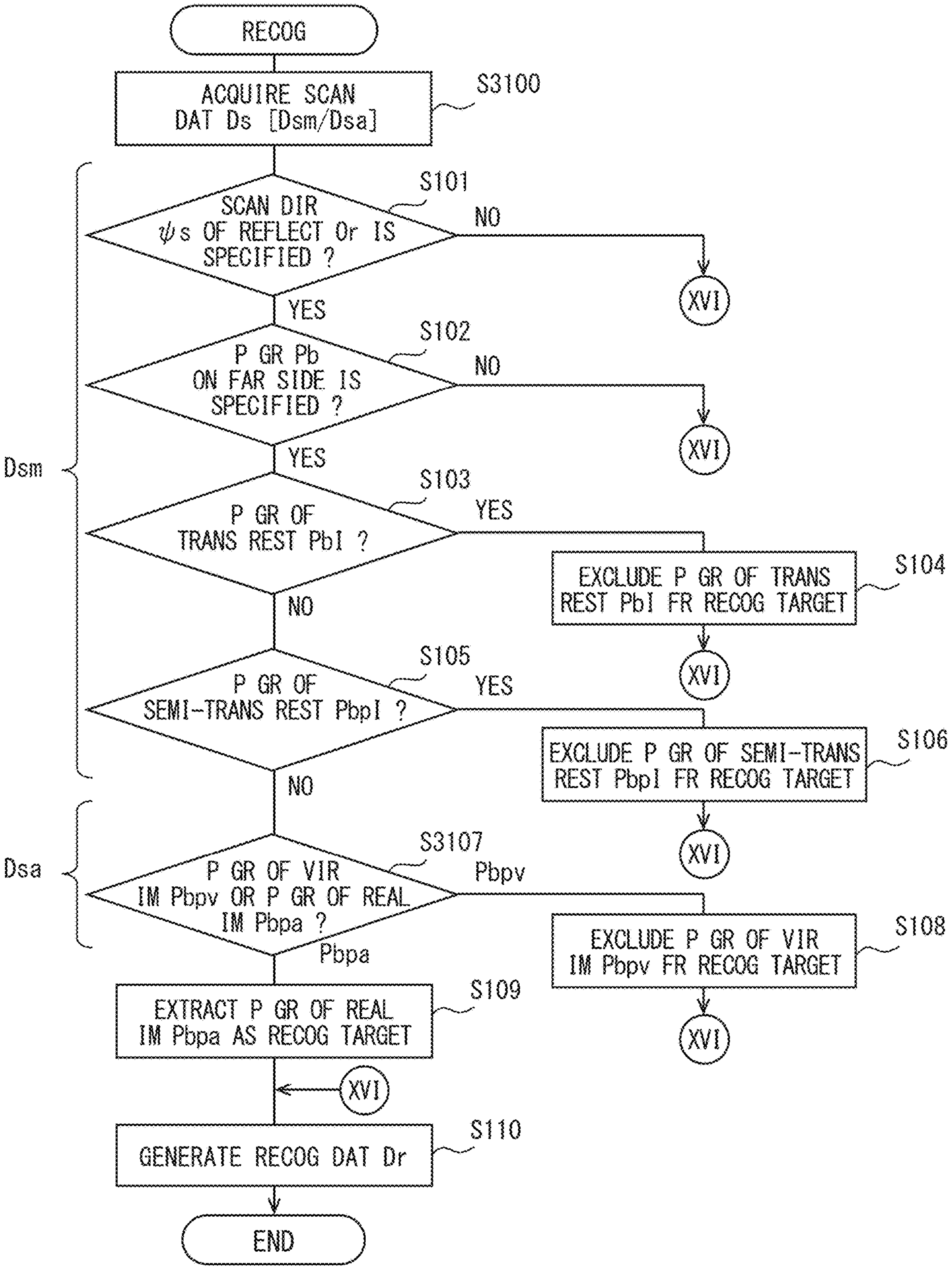
FIG. 16 is a flow chart illustrating a recognition flow according to the third embodiment.
Figure 17:
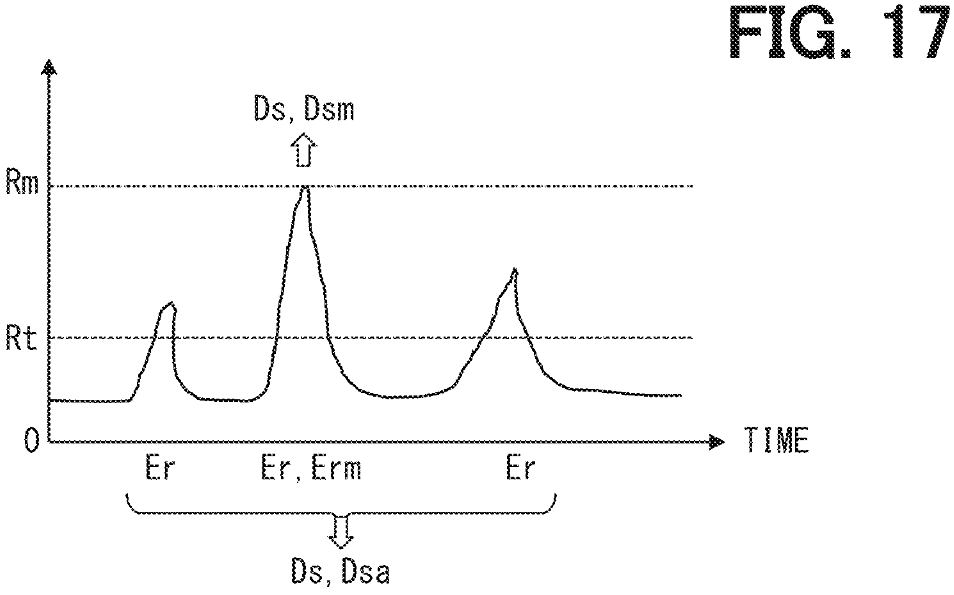
FIG. 17 is a characteristic diagram for illustrating a recognition flow according to a third embodiment.

As shown in FIG. 16, in the recognition flow of the third embodiment, steps S3100 and S3107 are executed instead of steps S100 and S107, respectively. Specifically, in S3100, the scanning block 100 acquires the scanning data Ds by receiving a reflection echo Er from the scanning space 30 in response to the irradiation light for each of a plurality of pixels in the scanning device 3. At this time, when at least one echo is received for each pixel in the scanning device 3 as a reflection echo Er with an intensity exceeding the threshold value Rt, as shown in FIG. 17, the state value of the scanning point group is converted into digital data and stored in the memory 10.

Therefore, for each pixel in the third embodiment, maximum intensity scanning data Dsm is defined as scanning data Ds including a scanning point group whose state value corresponding to the reflection echo Erm of the maximum intensity Rm among the received reflection echoes Er is the three-dimensional distance and/or the three-dimensional position coordinates. In addition, for each pixel in the third embodiment, total intensity scanning data Dsa is defined as scanning data Ds that includes a scanning point group whose state value corresponding to each of the reflection echos Erm received with all intensities is the three-dimensional distance and/or the three-dimensional position coordinates.

Under these definitions, in S3100 shown in FIG. 16, the maximum intensity scanning data Dsm is acquired by scan block 100 for use in the subsequent processes of S101 to S103, S105, and S110. Here, the total intensity scanning data Dsa is acquired by the scan block 100 in S3100 (for an example in FIG. 16) or S3107 for use by the process of S3107. Alternatively, when the total intensity scanning data Dsa is acquired before the determination of the virtual image point group Pbpv in S3107, the total intensity scanning data Dsa may be acquired as the point group data of state values in the entire pixel region, or the total intensity scanning data Dsa may be acquired as the point group data of state values in a partial pixel region including the voxels **300*s*, 300*b*** to be compared as described below.

Figure 18:
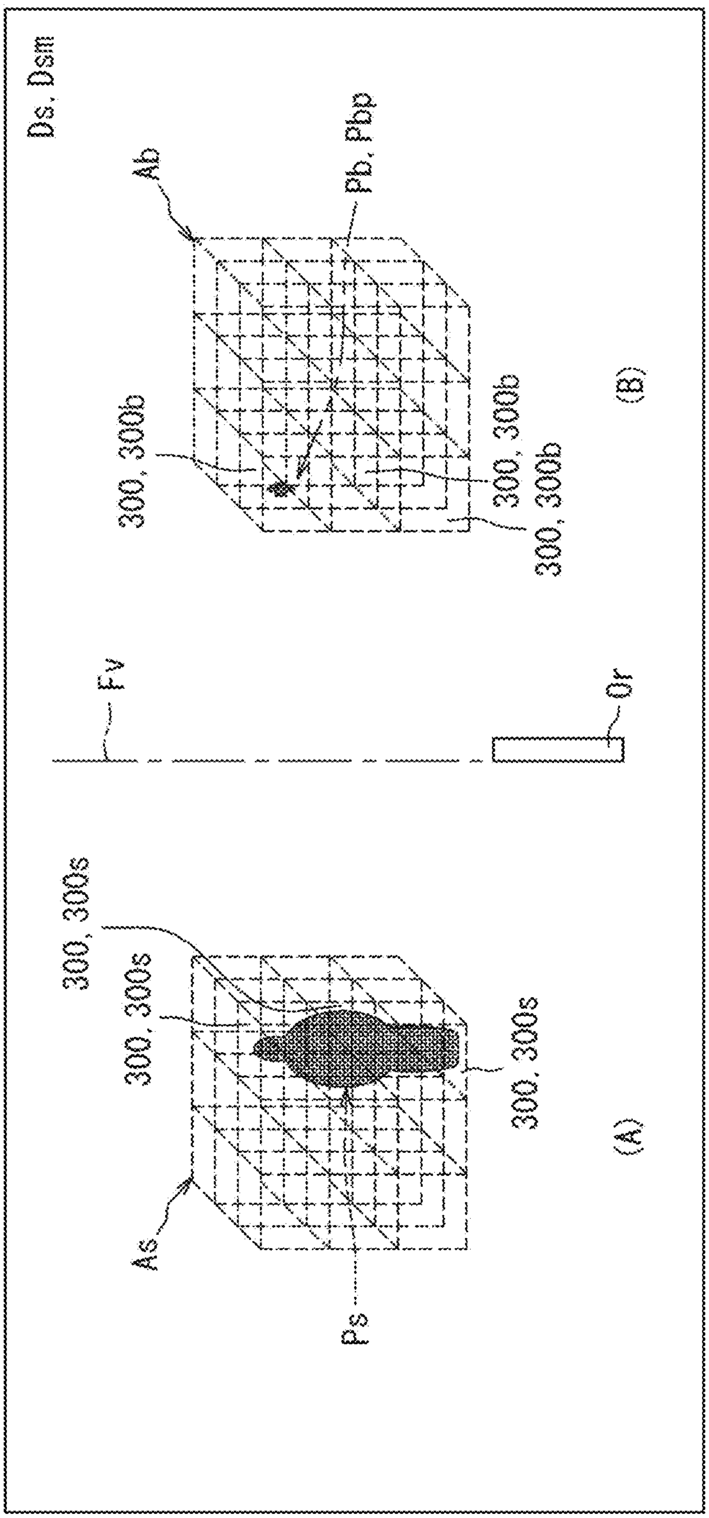
FIG. 18 is a schematic diagram of a perspective view for illustrating the recognition flow according to the third embodiment.
Figure 19:
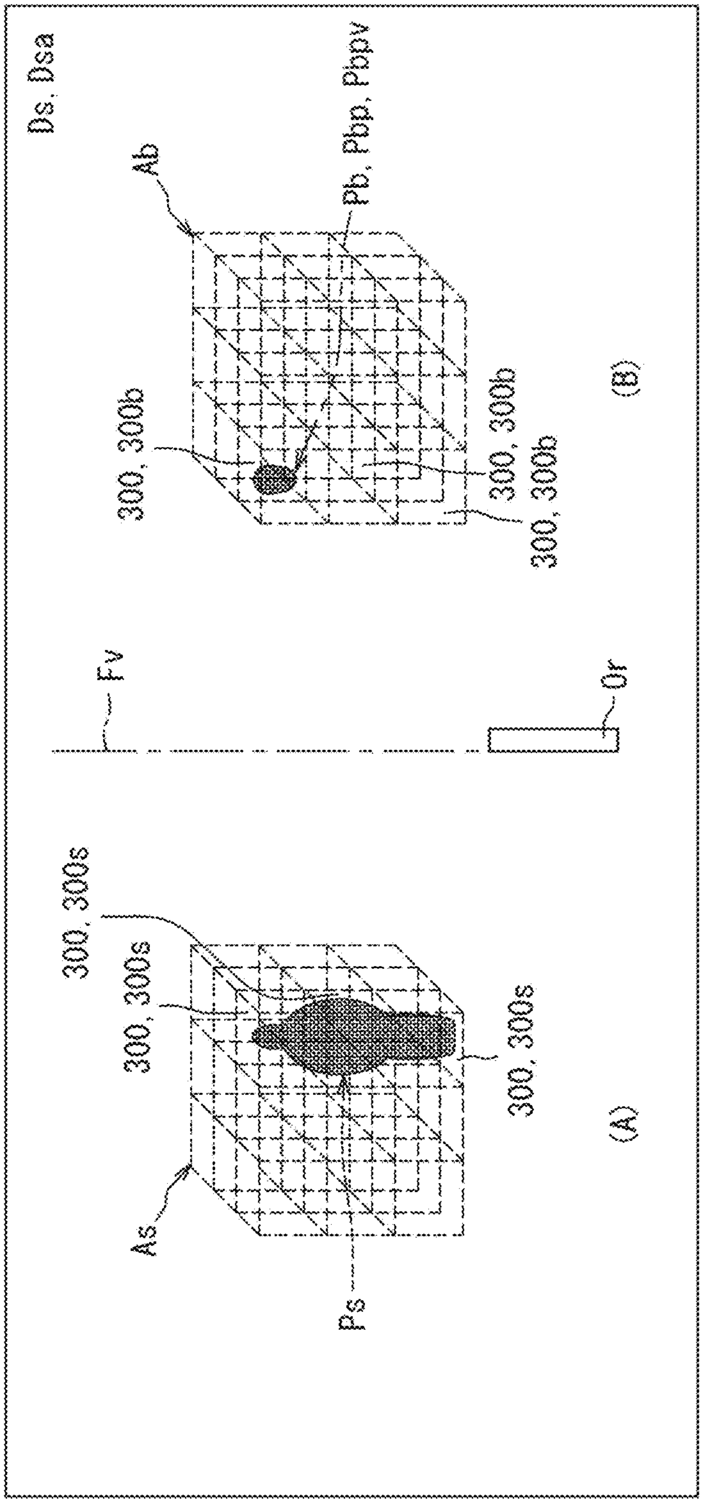
FIG. 19 is a schematic diagram of a perspective view for illustrating the recognition flow according to the third embodiment.

Furthermore, in S3107, the recognition block 110 sets the transmission permission point group Pbp excluding the semi-transmission restriction point group Pbpl in the total intensity scanning data Dsa shown in FIG. 19 as the distinction target between the virtual image point group Pbpv and the real image point group Pbpa, instead of the transmission permission point group Pbp excluding the semi-transmission restriction point group Pbpl in the maximum intensity scanning data Dsm shown in FIG. 18. Therefore, in S3107, the recognition block 110 searches for a virtual image point group Pbpv belonging to the far side voxel **300*b* whose point group distribution is similar to the symmetrical voxel 300*s* within the allowable range, similar to the first embodiment, among the transmission permission point group Pb other than the semi-transmission restriction point group Pbpl in the total intensity scanning data Dsa. As a result, the recognition flow proceeds from S3107 to S108 as shown in FIG. 16**, and the determined virtual image point group Pbpv is excluded from the recognition target of the target moving object Ot.

According to the third embodiment described above, the reflection echoes Er of the irradiation light from the scanning space 30 is received for each of a plurality of pixels in the scanning device 3. Therefore, in the maximum intensity scanning data Dsm, which includes the scanning point group corresponding to the reflection echo Er with the maximum intensity Rm received at each pixel, if there is a symmetrical point group Ps with respect to the far side point group Pb, the total intensity scanning data Dsa is further used. Specifically, in the total intensity scanning data Dsa, which includes the scanning point groups corresponding to all intensities of the reflection echoes Er received at each pixel, the far side point group Pb belonging to the far side voxel 300*b*, whose point group distribution is similar to the symmetrical voxel 300*s* within the allowable range, is excluded from the recognition target.

According to this third embodiment, the number of point groups that fit into the far side voxel 300*b* as the far side point group Pb in which the virtual image Iv of the symmetrical point group Ps is observed due to the reflector Or can be increased in accordance with the number of reflection echoes of all intensities. Therefore, based on the similarity between the point group distributions of the voxels 300*b* and 300*s*, the accuracy of distinction of the far side point group Pb at which the virtual image Iv is observed can be improved. As a result, it is possible to ensure high reliability in suppressing erroneous recognition caused by the generation of a virtual image Iv, and therefore high reliability in highly accurate recognition of the target moving object Ot.

Furthermore, according to the third embodiment, the far side point group Pb located at a position on the far side of the objects Or, Ol, which have optical characteristics that restrict the transmission of the irradiation light, can be searched for in a short time with high distinction accuracy based on the identification information σi in the maximum intensity scanning data Dsm, which has a smaller number of point groups than the total intensity scanning data Ds. On the other hand, when the maximum intensity scanning data Dsm includes a symmetrical point group Ps with respect to a far side point group Pb located on the far side of a reflector Or having optical characteristics that permits the transmission of the irradiation light, the total intensity scanning data Dsa is further used. Specifically, the far side point group Pb belonging to the far side voxel 300*b*, whose point group distribution is similar to the symmetrical voxel 300*s* within the allowable range, can be searched for with high distinction accuracy in the total intensity scanning data Dsa, which has a larger number of point groups than the maximum intensity scanning data Dsm. As a result of the above, it is possible to increase the processing speed, while ensuring high reliability in suppressing erroneous recognition caused by the generation of a virtual image Iv, and ultimately high reliability in highly accurate recognition of the target moving object Ot.

Other Embodiments

Although multiple embodiments have been described above, the present disclosure is not construed as being limited to those embodiments, and can be applied to various embodiments within a scope that does not depart from the spirit of the present disclosure.

In another modification, a dedicated computer constituting the recognition system 1 may include at least one of a digital circuit and an analog circuit, as a processor. The digital circuit is at least one type of, for example, an application specific integrated circuit (i.e., ASIC), a field programmable gate array (i.e., FPGA), a system on a chip (i.e., SOC), a programmable gate array (i.e., PGA), a complex programmable logic device (i.e., CPLD), and the like. Such a digital circuit may also include a memory in which a program is stored.

In a modification example, at least one of the set of S103 and S104 and the set of S105 and S106 may be omitted. In a modification example, S103 to S109, S2107, S2108, and S3107 may be executed independently for each scanning direction ψs of the multiple reflectors Or specified in S101. In a modification example, the identification of the reflector Or in S101 may be realized based on the past scanning data Ds instead of or in addition to being based on the map data Dm.

Figure 20:
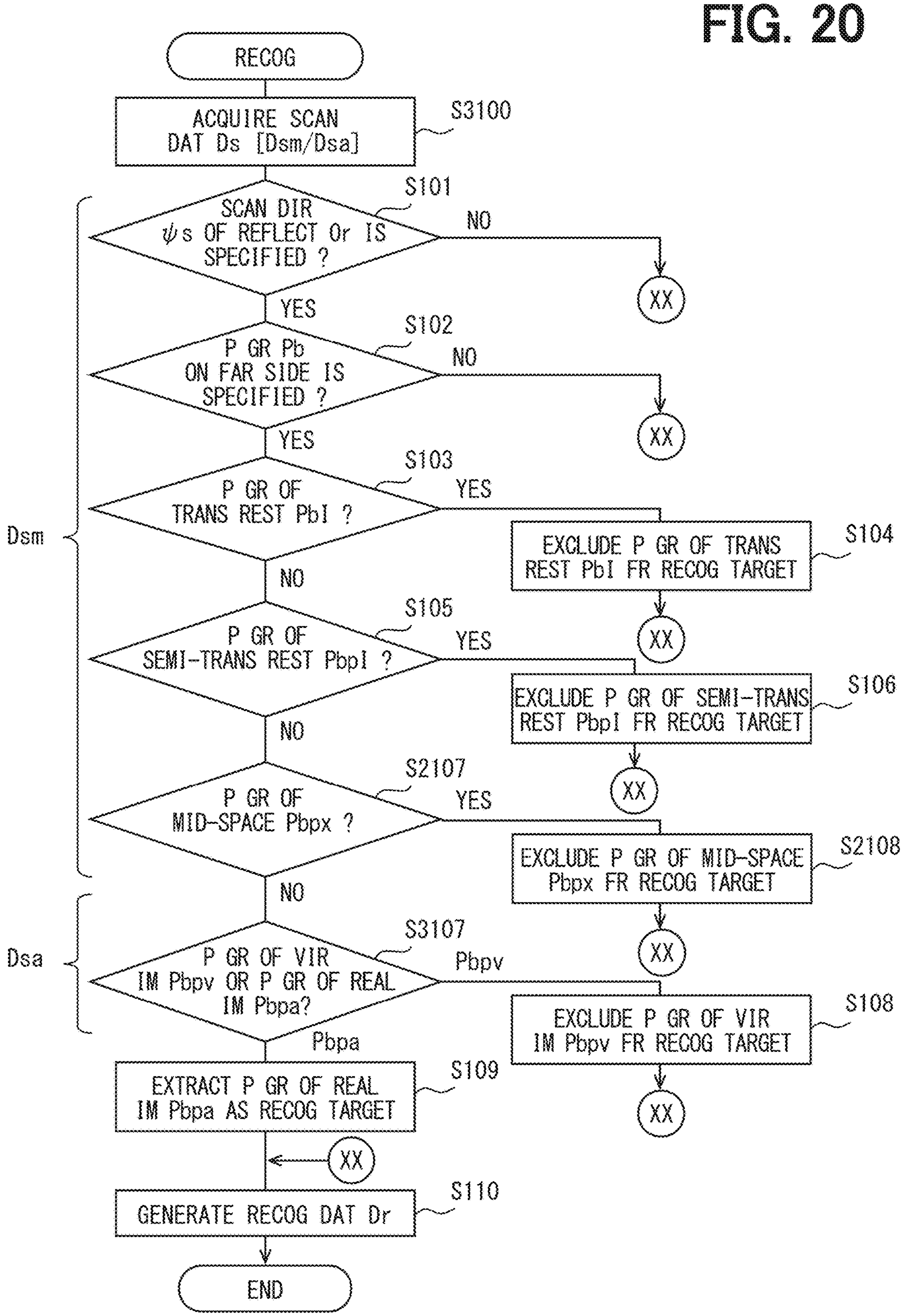
FIG. 20 is a flowchart showing a recognition flow according to a modification of the third embodiment to which the second embodiment is combined.
Figure 21:
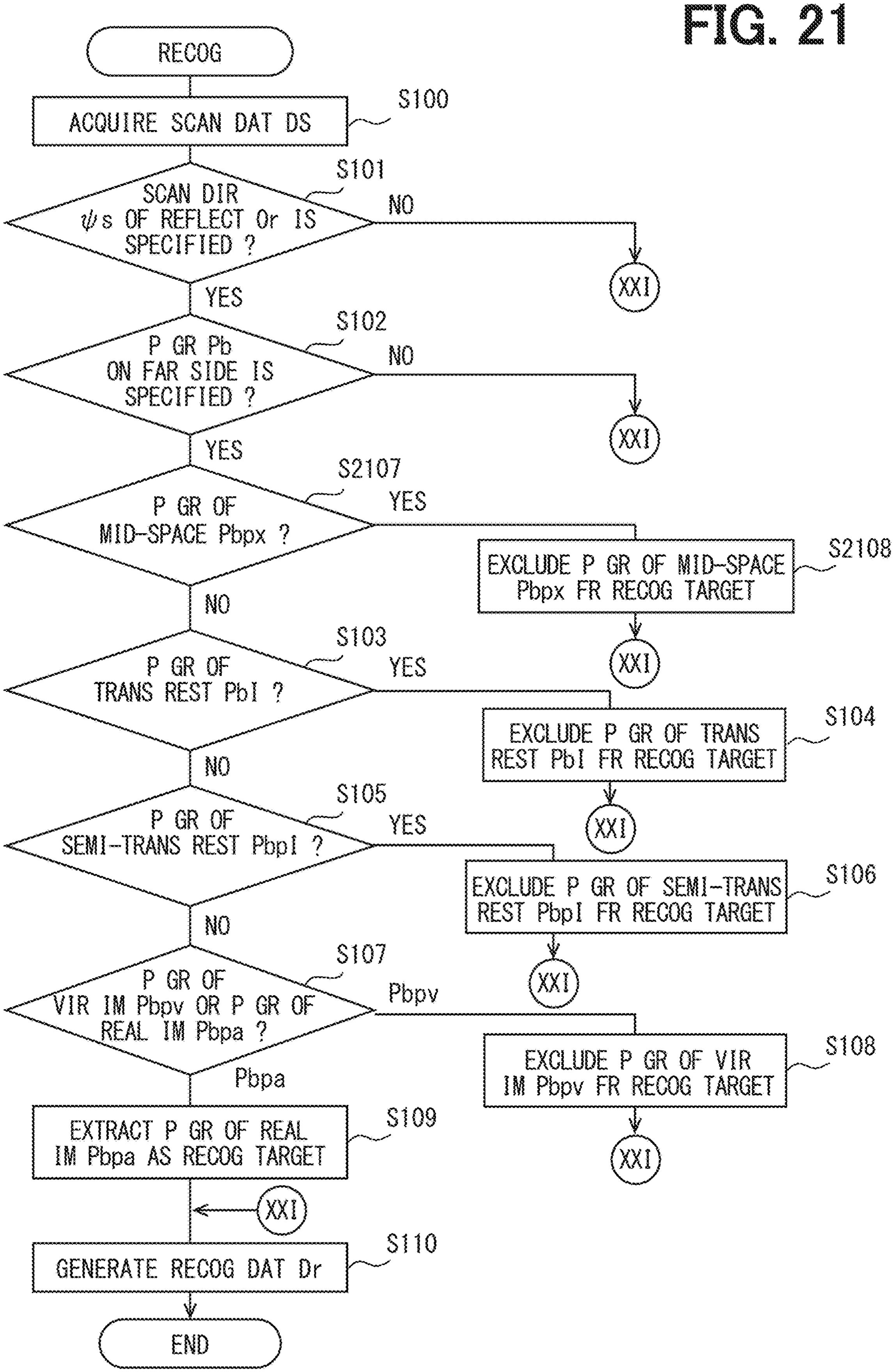
FIG. 21 is a flowchart showing a recognition flow according to a modification of the second embodiment.

In a modification example, steps S2107 and S2108 of the second embodiment may be combined to the third embodiment as shown in FIG. 20. In a modification example, the recognition flow of the second embodiment may proceed to S103 when a negative determination is made in S2107 executed following a positive determination in S102, as shown in FIG. 21. Here, in S2107 following the positive determination in S102, as a scanning point group at a position on the far side of the reflector Or, a space point group Pbx existing in the space area Ax represented by the identification information σi may be searched for from the far side point group Pb in which the point groups Pbl, Pbpl, Pbpv, and Pbpa as the search target in the subsequent steps S103, S105, and S107 are in an unsearched state, so that the space point group Pbx may be excluded from the recognition target in S2108.

In a modification example, the host vehicle 2 to which the recognition system 1 is applied may be, for example, an autonomous robot capable of transporting luggage or collecting information by autonomous driving or remote driving. In addition to the above-described embodiments and modifications, the present disclosure may be implemented in forms of a processing circuit (for example, a processing ECU, and the like) or a semiconductor device (e.g., a semiconductor chip, and the like), as a control device mountable on a host vehicle 2 and including at least one processor 12 and at least one memory 10.

The present specification discloses a plurality of technical ideas listed below and a plurality of combinations thereof.

(Technical Feature 1)

A recognition system has a processor with a memory storing computer program code for recognizing a target moving object capable of moving in a scanning space scanned by irradiation light from a scanning device in a host vehicle.

The processor is configured to execute:

acquiring scanning data including a far side point group as a scanning point group at a position on a far side of a reflector in a scanning direction in which the reflector is disposed in a focus range in which a reflection characteristic with respect to the irradiation light is on a high reflection side, and is scanned by the irradiation light; and generating recognition data by excluding, from the far side point group for the target moving object as the recognition target in the scanning data, a part of the far side point group corresponding to a symmetrical point group which is disposed in a symmetrical area corresponding to the position on the far side of the reflector.

The symmetrical point group corresponds to a scanning point group of a real image that causes a virtual image to appear at the position on the far side of the reflector.

(Technical Feature 2)

The recognition system according to the technical feature 1, further includes: a storage medium for storing map data including identification information for identifying an object present in the scanning space.

The acquiring of the scanning data includes: acquiring the scanning data including a far side point group disposed at the position on the far side f the reflector which is identified based on the identification information read out from the storage medium.

(Technical Feature 3)

In the recognition system according to the technical feature 2, the generating of the recognition data includes: excluding, from the recognition target, the far side point group corresponding to a symmetrical point group which is disposed in a symmetrical area with respect to the position on the far side of the reflector whose optical characteristic is indicated by the identification information that a transmission of the irradiation light is permitted.

(Technical Feature 4)

In the recognition system according to the technical feature 3, the generating of the recognition data includes: excluding, from the recognition target, a far side point group disposed at the position on the far side of the reflector whose optical characteristic is indicated by the identification information that a transmission of the irradiation light is permitted, and on the far side of a fixed object whose optical characteristic is indicated by the identification information that a transmission of the irradiation light is restricted.

(Technical Feature 5)

In the recognition system according to the technical feature 3, the generating of the recognition data includes: excluding, from the recognition target, the far side point group disposed on the far side of the reflector whose optical characteristic is indicated by the identification information that a transmission of the irradiation light is restricted.

(Technical Feature 6)

In the recognition system according to any one of the technical features 2 to 5, the generating of the recognition data includes: excluding, from the recognition target, the far side point group disposed in a space area represented by the identification information among far side positions of the reflector.

(Technical Feature 7)

In the recognition system according to the technical feature 3, the generating of the recognition data includes:

- defining a far side voxel to which the far side point group belongs and a symmetrical voxel for which a symmetrical point group is searched, as a plurality of three-dimensional voxels prepared by dividing the scanning space; and
- excluding, from the recognition target, the far side point group belonging to the far side voxel whose point group distribution is similar to the symmetrical voxel within an allowable range.

(Technical Feature 8)

In the recognition system according to the technical feature 7, the acquiring of the scanning data includes:

- receiving a reflection echo from the scanning space in response to the irradiation light for each of a plurality of pixels in the scanning device;
- acquiring maximum intensity scanning data as the scanning data including the scanning point group corresponding to the reflection echo having a maximum intensity received for each pixel; and
- acquiring total intensity scanning data as the scanning data including the scanning point group corresponding to reflection echoes in all intensities received for each pixel.

The generating of the recognition data includes: excluding, from the recognition target, the far side point group belonging to the far side voxel whose point group distribution in the total intensity scanning data is similar to the symmetrical voxel within an allowable range when the symmetrical point group corresponding to the far side point group exists in the maximum intensity scanning data.

(Technical Feature 9)

In the recognition system according to the technical feature 8, the generating of the recognition data includes:

- searching the far side point group in the maximum intensity scanning data at a position on the far side of an object having optical characteristic that restricts a transmission of the irradiation light; excluding a searched far side point group from the recognition target;
- searching the far side point group belonging to the far side voxel whose point group distribution in the total intensity scanning data is similar to the symmetrical voxel within an allowable range when the symmetrical point group corresponding to the far side point group disposed on the far side of the reflector having an optical characteristic that permits a transmission of the irradiation light exists in the maximum intensity scanning data; and
- excluding a searched far side point group from the recognition target.

(Technical Feature 10)

In the recognition system according to the technical feature 3, the generating of the recognition data includes: excluding, from the recognition target, the far side point group that moves in an opposite direction to the host vehicle at a relative speed corresponding to a travelling speed of the host vehicle.

(Technical Feature 11)

In the recognition system according to the technical feature 3, the generating of the recognition data includes: storing the recognition data in a storage medium in the host vehicle.

(Technical Feature 12)

In the recognition system according to the technical feature 3, the generating of the recognition data includes: controlling a display of the recognition data in the host vehicle.

(Technical Feature 13)

In the recognition system according to the technical feature 3, the generating of the recognition data includes: controlling a transmission of the recognition data from the host vehicle.

The above-mentioned technical features 1 to 13 may be realized in the form of a recognition device, a recognition method, a recognition program, and a recognition data generation method.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A recognition system for recognizing a target moving object capable of moving in a scanning space scanned by irradiation light from a scanning device in a host vehicle, the recognition system comprising:

a processor, wherein:

the processor is configured to execute:

acquiring scanning data including a far side point group as a scanning point group at a position on a far side of a reflector in a scanning direction in which the reflector is disposed in a focus range in which a reflection characteristic with respect to the irradiation light is on a high reflection side, and is scanned by the irradiation light; and generating recognition data by excluding, from the far side point group for the target moving object as a recognition target in the scanning data, a part of the far side point group corresponding to a symmetrical point group which is disposed in a symmetrical area corresponding to the position on the far side of the reflector; and the symmetrical point group corresponds to a scanning point group of a real image that causes a virtual image to appear at the position on the far side of the reflector, the recognition system further comprising:

a storage medium for storing map data including identification information for identifying an object present in the scanning space, wherein:

the acquiring of the scanning data includes: acquiring the scanning data including the far side point group at the position on the far side of the reflector identified based on the identification information read from the storage medium; and the generating of the recognition data includes: excluding, from the recognition target, the far side point group corresponding to a symmetrical point group which is disposed in a symmetrical area with respect to the position on the far side of the reflector whose optical characteristic is indicated by the identification information that a transmission of the irradiation light is permitted.

2. The recognition system according to claim 1, wherein:

the generating of the recognition data includes:

excluding, from the recognition target, the far side point group disposed at the position on the far side of the reflector whose optical characteristic is indicated by the identification information that the transmission of the irradiation light is permitted, and on the far side of a fixed object whose optical characteristic is indicated by the identification information that the transmission of the irradiation light is restricted.

3. The recognition system according to claim 1 wherein:

the generating of the recognition data includes:

excluding, from the recognition target, the far side point group disposed at the position on the far side of the reflector whose optical characteristic is indicated by the identification information that the transmission of the irradiation light is restricted.

4. The recognition system according to claim 1, wherein:

the generating of the recognition data includes:

excluding, from the recognition target, the far side point group disposed in a space area represented by the identification information among positions on the far side of the reflector.

5. The recognition system according to claim 1, wherein the generating of the recognition data includes:

defining a far side voxel to which the far side point group belongs and a symmetrical voxel for which a symmetrical point group is searched, as a plurality of three-dimensional voxels prepared by dividing the scanning space; and excluding, from the recognition target, the far side point group belonging to the far side voxel whose point group distribution is similar to the symmetrical voxel within an allowable range.

6. The recognition system according to claim 5, wherein:

the acquiring of the scanning data includes:

receiving a reflection echo from the scanning space in response to the irradiation light for each of a plurality of pixels in the scanning device;

acquiring maximum intensity scanning data as the scanning data including the scanning point group corresponding to the reflection echo having a maximum intensity received for each pixel; and acquiring total intensity scanning data as the scanning data including the scanning point group corresponding to reflection echoes in all intensities received for each pixel; and the generating of the recognition data includes:

excluding, from the recognition target, the far side point group belonging to the far side voxel whose point group distribution in the total intensity scanning data is similar to the symmetrical voxel within an allowable range when the symmetrical point group corresponding to the far side point group exists in the maximum intensity scanning data.

7. The recognition system according to claim 6, wherein:

the generating of the recognition data includes:

searching the far side point group in the maximum intensity scanning data at a position on the far side of an object having optical characteristic that restricts a transmission of the irradiation light; excluding a searched far side point group from the recognition target;

searching the far side point group belonging to the far side voxel whose point group distribution in the total intensity scanning data is similar to the symmetrical voxel within an allowable range when the symmetrical point group corresponding to the far side point group disposed at the position on the far side of the reflector having an optical characteristic that permits a transmission of the irradiation light exists in the maximum intensity scanning data; and excluding a searched far side point group from the recognition target.

8. The recognition system according to claim 1, wherein: the generating of the recognition data includes:

excluding, from the recognition target, the far side point group that moves in an opposite direction to the host vehicle at a relative speed corresponding to a travelling speed of the host vehicle.

9. The recognition system according to claim 1, wherein: the generating of the recognition data includes: storing the recognition data in a storage medium in the host vehicle.

10. The recognition system according to claim 1, wherein: the generating of the recognition data includes: controlling a display of the recognition data in the host vehicle.

11. The recognition system according to claim 1, wherein: the generating of the recognition data includes: controlling a transmission of the recognition data from the host vehicle.

12. A recognition device mountable on a host vehicle for recognizing a target moving object capable of moving in a scanning space scanned by irradiation light from a scanning device in the host vehicle, the recognition device comprising:

a processor, wherein:

the processor is configured to execute:

acquiring scanning data including a far side point group as a scanning point group at a position on a far side of a reflector in a scanning direction in which the reflector is disposed in a focus range in which a reflection characteristic with respect to the irradiation light is on a high reflection side, and is scanned by the irradiation light; and generating recognition data by excluding, from the far side point group for the target moving object as a recognition target in the scanning data, a part of the far side point group corresponding to a symmetrical point group which is disposed in a symmetrical area corresponding to the position on the far side of the reflector; and the symmetrical point group corresponds to a scanning point group of a real image that causes a virtual image to appear at the position on the far side of the reflector, the recognition device further comprising:

a storage medium for storing map data including identification information for identifying an object present in the scanning space, wherein:

the acquiring of the scanning data includes: acquiring the scanning data including the far side point group at the position on the far side of the reflector identified based on the identification information read from the storage medium; and the generating of the recognition data includes: excluding, from the recognition target, the far side point group corresponding to a symmetrical point group which is disposed in a symmetrical area with respect to the position on the far side of the reflector whose optical characteristic is indicated by the identification information that a transmission of the irradiation light is permitted.

13. A recognition method executed by a processor to recognize a target moving object capable of moving in a scanning space scanned by irradiation light from a scanning device in a host vehicle, the method comprising:

acquiring scanning data including a far side point group as a scanning point group at a position on a far side of a reflector in a scanning direction in which the reflector is disposed in a focus range in which a reflection characteristic with respect to the irradiation light is on a high reflection side, and is scanned by the irradiation light; and generating recognition data by excluding, from the far side point group for the target moving object as a recognition target in the scanning data, a part of the far side point group corresponding to a symmetrical point group which is disposed in a symmetrical area corresponding to the position on the far side of the reflector, wherein:

the symmetrical point group corresponds to a scanning point group of a real image that causes a virtual image to appear at the position on the far side of the reflector, the recognition method further comprising:

storing map data including identification information for identifying an object present in the scanning space, wherein:

the acquiring of the scanning data includes: acquiring the scanning data including the far side point group at the position on the far side of the reflector identified based on the identification information read from the storage medium; and the generating of the recognition data includes: excluding, from the recognition target, the far side point group corresponding to a symmetrical point group which is disposed in a symmetrical area with respect to the position on the far side of the reflector whose optical characteristic is indicated by the identification information that a transmission of the irradiation light is permitted.

14. A non-transitory computer readable storage medium comprising instructions being stored in a storage medium and executed by a computer, the instructions including a computer-implemented method for recognizing a target moving object capable of moving in a scanning space scanned by irradiation light from a scanning device in a host vehicle, wherein:

the instructions include:

acquiring scanning data including a far side point group as a scanning point group at a position on a far side of a reflector in a scanning direction in which the reflector is disposed in a focus range in which a reflection characteristic with respect to the irradiation light is on a high reflection side, and is scanned by the irradiation light; and generating recognition data by excluding, from the far side point group for the target moving object as a recognition target in the scanning data, a part of the far side point group corresponding to a symmetrical point group which is disposed in a symmetrical area corresponding to the position on the far side of the reflector;

the symmetrical point group corresponds to a scanning point group of a real image that causes a virtual image to appear at the position on the far side of the reflector;

the instructions further include: a storage medium for storing map data including identification information for identifying an object present in the scanning space;

the acquiring of the scanning data includes: acquiring the scanning data including the far side point group at the position on the far side of the reflector identified based on the identification information read from the storage medium; and the generating of the recognition data includes: excluding, from the recognition target, the far side point group corresponding to a symmetrical point group which is disposed in a symmetrical area with respect to the position on the far side of the reflector whose optical characteristic is indicated by the identification information that a transmission of the irradiation light is permitted.

15. A recognition data generation method executed by a processor for generating recognition data by recognizing a target moving object capable of moving in a scanning space scanned by irradiation light from a scanning device in a host vehicle, the recognition data generation method comprising:

acquiring scanning data including a far side point group as a scanning point group at a position on a far side of a reflector in a scanning direction in which the reflector is disposed in a focus range in which a reflection characteristic with respect to the irradiation light is on a high reflection side, and is scanned by the irradiation light; and generating the recognition data by excluding, from the far side point group for the target moving object as a recognition target in the scanning data, a part of the far side point group corresponding to a symmetrical point group which is disposed in a symmetrical area corresponding to the position on the far side of the reflector, wherein:

the symmetrical point group corresponds to a scanning point group of a real image that causes a virtual image to appear at the position on the far side of the reflector, the recognition data generation method further comprising:

a storage medium for storing map data including identification information for identifying an object present in the scanning space, wherein:

the acquiring of the scanning data includes: acquiring the scanning data including the far side point group at the position on the far side of the reflector identified based on the identification information read from the storage medium; and the generating of the recognition data includes: excluding, from the recognition target, the far side point group corresponding to a symmetrical point group which is disposed in a symmetrical area with respect to the position on the far side of the reflector whose optical characteristic is indicated by the identification information that a transmission of the irradiation light is permitted.

* * * * *